United States Patent [19]
Itoh et al.

[11] Patent Number: 5,950,027
[45] Date of Patent: Sep. 7, 1999

[54] CAMERA LOADABLE WITH A FILM PROVIDED WITH A MAGNETIC RECORDING AREA

[75] Inventors: Hisanori Itoh, Sakai; Nobuharu Murashima, Nara; Yoshito Konishi, Sakai, all of Japan

[73] Assignee: Minolta Co., Ltd., Osaka, Japan

[21] Appl. No.: 08/791,525

[22] Filed: Jan. 30, 1997

[30] Foreign Application Priority Data

| Jan. 31, 1996 | [JP] | Japan | 8-15865 |
| Jan. 31, 1996 | [JP] | Japan | 8-15866 |
| Jan. 31, 1996 | [JP] | Japan | 8-15867 |
| Jan. 31, 1996 | [JP] | Japan | 8-16234 |

[51] Int. Cl.$^6$ ................................................ G03B 17/24
[52] U.S. Cl. ........................... 396/320; 396/392; 396/409
[58] Field of Search ................................ 396/310, 311, 396/319, 320, 387, 395, 392, 409

[56] References Cited

U.S. PATENT DOCUMENTS

| 4,417,793 | 11/1983 | Oyokota et al. | 396/395 |
| 5,555,047 | 9/1996 | Tsuji et al. | 396/319 |
| 5,559,568 | 9/1996 | Kazami et al. | 396/319 |
| 5,576,785 | 11/1996 | Kazami et al. | 396/397 |
| 5,587,751 | 12/1996 | Hibino et al. | 396/319 |
| 5,649,246 | 7/1997 | Hibiho | 396/310 |
| 5,768,642 | 6/1998 | Sugiyama et al. | 396/319 |

FOREIGN PATENT DOCUMENTS 8-122909  5/1996  Japan.

*Primary Examiner*—Safet Metjahic
*Assistant Examiner*—Michael Dalakis
*Attorney, Agent, or Firm*—McDermott, Will & Emery

[57] ABSTRACT

A camera loadable with a film regularly formed with perforations along a length of the film and provided with exposure areas and magnetic recording areas arranged with reference to the perforations, the camera includes: a perforation detector which detects a perforation; a recording device which records magnetic data in a magnetic recording area; and a controller which controls the recording of the recording device in accordance with a detection of the perforation detector. The camera can securely perform a proper magnetic recording and recording of a photographed image within a set exposure area.

1 Claim, 22 Drawing Sheets

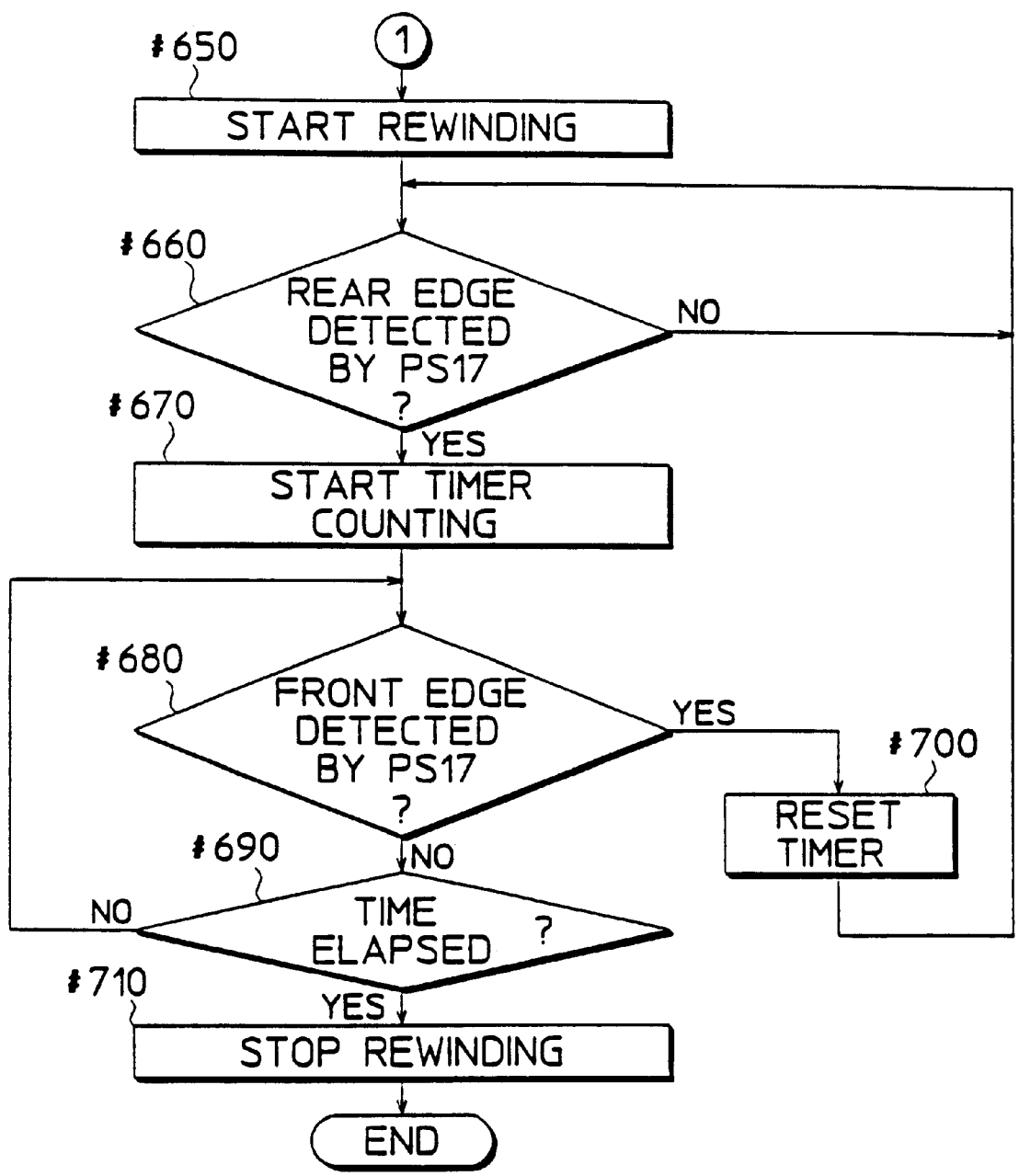

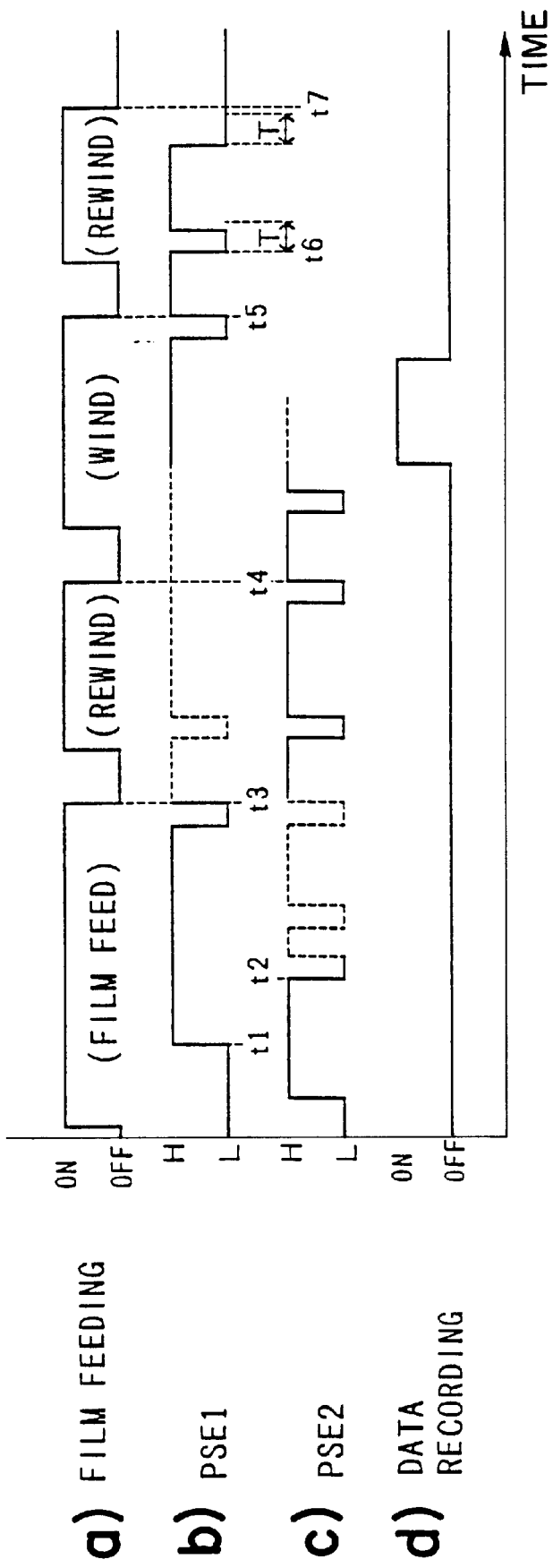

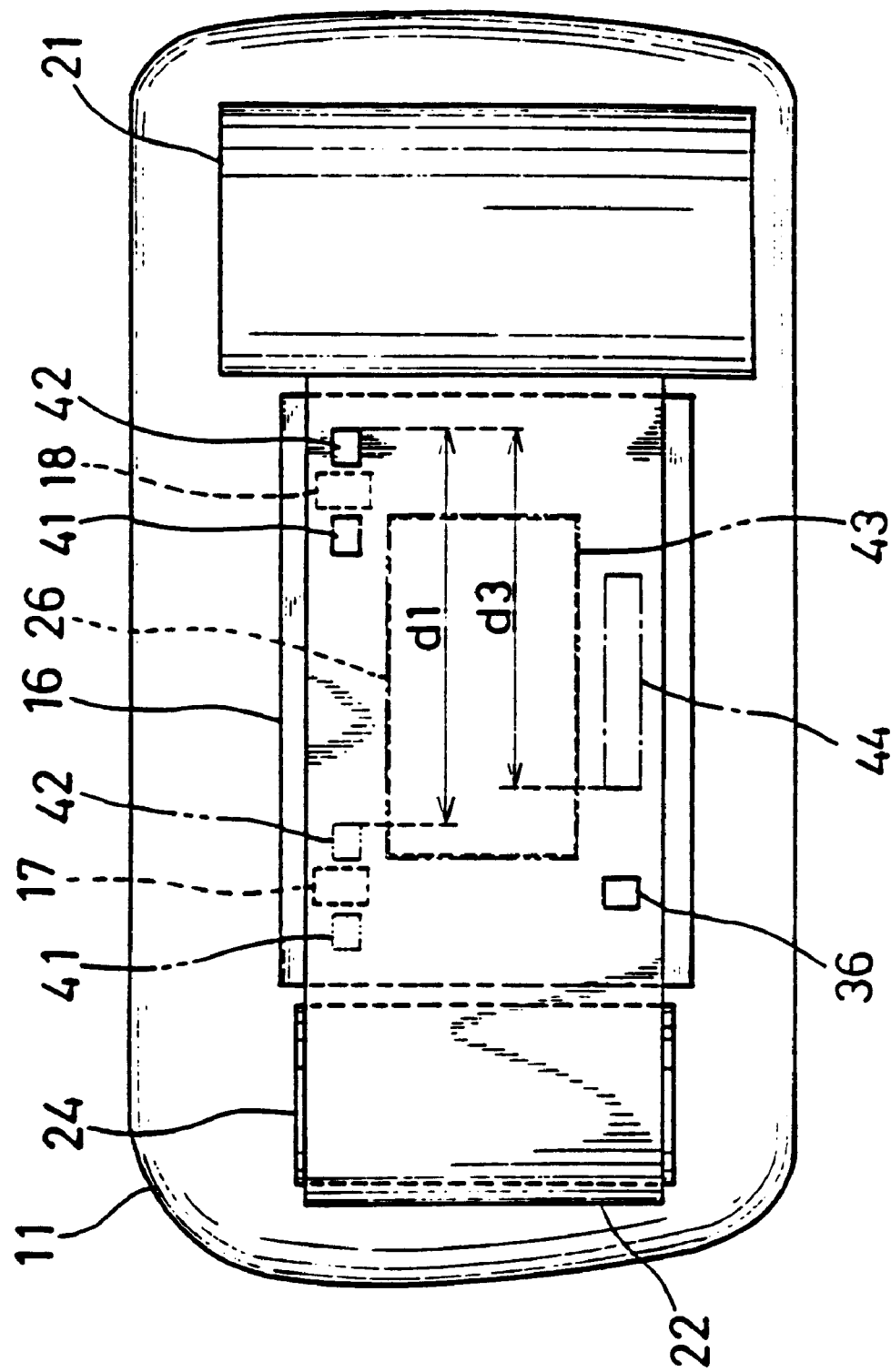

CAMERA LOADABLE WITH A FILM PROVIDED WITH A MAGNETIC RECORDING AREA

BACKGROUND OF THE INVENTION

This invention relates to a camera loadable with a film provided with a magnetic recording area.

In conventional cameras, winding of a film or the like is performed by fitting projections provided on the outer surface of a take-up spool in perforations formed in the film. In recent years, there have been proposed films in accordance with a novel system in which pairs of perforations are regularly formed along a film winding direction and exposure areas for recording photographed images and magnetic recording areas for recording specified magnetic data are provided in predetermined positions. In these films, the perforations are not used for the winding, but used as references for the positioning of the exposure area and the magnetic recording area.

Accordingly, cameras using such a film have a problem that a specified magnetic data cannot be recorded in a set magnetic recording area unless a distance the film is fed before the start of magnetic recording after the detection of the perforation is accurately detected.

Also, there is a problem that an image cannot be recorded in a set exposure area unless winding is accurately stopped based on the detection of the perforation.

On the other hand, magnetic recording may be performed during the winding of the film. In such a case, there arises a problem that, when a winding speed varies, magnetic recording cannot properly be performed due to a variation of a bit density or the like.

Further, with the cameras using the films in accordance with the novel system, the magnetic data may be recording during the winding of the film which is performed after each photographing operation.

Generally, the film winding speed largely varies depending upon how much a battery is used up. As described above, the magnetic recording areas are provided in preset positions and an amount of data to be recorded (bit number) is predetermined. Accordingly, if the magnetic data is recorded at a specific frequency, the following problem arises: the magnetic data cannot be recorded in the predetermined magnetic recording area when the winding speed is high, whereas the bit density becomes excessively high, making it difficult to read the recorded data when the winding speed is low.

The magnetic recording areas include frame magnetic recording portions provided in correspondence with the respective frames so as to record data including a photographing information of each frame and a leader magnetic recording portion provided at the side of a leading frame toward the leading end of the film so as to record a title of the film or like information concerning the film. These magnetic recording portions are arranged in specified positions based on the perforations.

In the cameras using the film as above, the film is automatically wound by one frame after photographing is performed. Data may be recording by a magnetic head provided in a camera main body while the film is wound by one frame.

The data recorded in each frame magnetic recording portion include data settable before a photographed image is recorded in the corresponding frame as well as the number of prints to be made or like data which may be changed depending upon how the photographed image is recorded in the frame. In view of data reading at a later stage, the following problem arises: it is desirable to record a change data in place of the data already recorded in the frame magnetic recording portion in the same state as this data was initially recorded.

Film data concerning the film are recorded in the leader magnetic recording portion. In view of collective reading of the film data and the frame data at a later stage, the following problem arises: it is desirable to record the film data in the leader magnetic recording portion in the same state as the frame data are recorded in the frame magnetic recording portions.

SUMMARY OF THE INVENTION

It is an object of the present invention to provide a camera which has overcome the problems residing in the prior art.

It is another object of the present invention to provide a camera which can securely perform a proper magnetic recording.

It is still another object of the present invention to provide a camera which can securely record a photographed image within a set exposure area.

According to an aspect of the present invention, a camera loadable with a film regularly formed with perforations along a length of the film and provided with exposure areas and magnetic recording areas arranged with reference to the perforations, the camera comprising: a perforation detector which detects a perforation; a recording device which records magnetic data in a magnetic recording area; and a controller which controls the recording of the recording device in accordance with a detection of the perforation detector.

The controller may control the recording device to execute the recording during the time when the film is being fed. Further, the recording may be started when the film feeding amount after detection of a perforation reaches a predetermined amount. Also, the recording may be started when the film feeding amount after detection of a rear end of a perforation reaches the predetermined amount.

The perforation detector may be located forward from a perforation corresponding to an exposure area at an exposure position with respect to a film winding direction.

According to another aspect of the present invention, a camera loadable with a film regularly formed with perforations along a length of the film and provided with magnetic recording areas arranged with reference to the perforations, the camera comprising: a film feeding device which feeds the film; a recording device which records magnetic data in a magnetic recording area at a set frequency during the time when the film is being fed; and a controller which sets a magnetic recording frequency in accordance with a film feeding speed to ensure a proper record density.

It may be preferable that the magnetic recording frequency is proportional to the film feeding speed.

The camera may be further provided with a speed detector for detecting a film feeding speed based on a rotating amount of a motor of the film feeding device.

The recording may be started when the film is fed a predetermined amount after detection of a perforation.

According to still another aspect of the present invention, a camera loadable with a film regularly formed with perforations along a length of the film and provided with exposure areas and magnetic recording areas arranged with reference to the perforations, the camera comprising: a film feeding device which feeds the film; a recording device which records magnetic data in a magnetic recording area during the time when the film is being fed; and a controller which controls the film feeding device to feed the film at a predetermined constant speed during the recording.

It may be appreciated to reduce the film feeding speed from the predetermined constant speed after the recording is completed. Further, the film feeding may be preferably stopped when a perforation is detected after the recording is completed. The reduction of film feeding speed may be started immediately after the recording is completed.

According to yet still another aspect of the present invention, a camera loadable with a film provided with magnetic recording areas corresponding to exposure areas respectively, the camera comprising: a film feeding device which feeds the film; a recording device which records magnetic data in connection with a content in a specified exposure area in a magnetic recording area corresponding to the specified exposure area during the time when the film is being fed a distance for one exposure area; a changing device which changes magnetic data to be recorded in a specified magnetic recording area; and a controller which controls the film feeding device and the recording device to feed the film so that a magnetic recording area to be recorded with changed data reaches a specified recording position, and to execute the recording while feeding the film a distance for one exposure area.

According to a further aspect of the present invention, a camera loadable with a film provided with first magnetic recording areas corresponding to exposure areas respectively and a second magnetic recording area in a leader portion of the film, the camera comprising: a film feeding device which feeds the film; a recording device which records magnetic data in first or second magnetic recording area; a first controller which controls the film feeding device and the recording device to record magnetic data in a first magnetic recording area during the time when winding the film; and a second controller which controls the film feeding device and the recording device to wind the film until the second magnetic recording area passes a recording position, and rewind the film so that the second recording area faces the recording position, and record magnetic data in the second recording area while winding the film again.

According to a still further aspect of the present invention, a camera loadable with a film regularly formed with perforations along a length of the film and capable of exposing the film in areas with reference to the perforations, the camera comprising a perforation detecting system including two detectors provided at such positions that the detectors are operable to face perforations and to come in forward and rearward ends of an exposed area with respect to a winding direction, the two detectors having a gap therebetween equal to an interval of the perforations.

According to a yet further aspect of the present invention, a camera loadable with a film provided with a magnetic recording area, the camera comprising: a film feeding device which feeds the film; a recording device which records magnetic data in the magnetic recording area; and a controller which controls the recording device to record magnetic data in the magnetic recording area when feeding the film in a predetermined direction.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIGS. 19 and 20 are a flowchart showing a procedure of recording magnetic data in a leader magnetic recording portion;

FIG. 21 is a timing chart showing the states of the respective elements; and

FIG. 22 is a diagram showing the position detection of the leader magnetic recording portion.

DETAILED DESCRIPTION OF THE PREFERRED EMBODIMENT OF THE INVENTION

Figure 1:
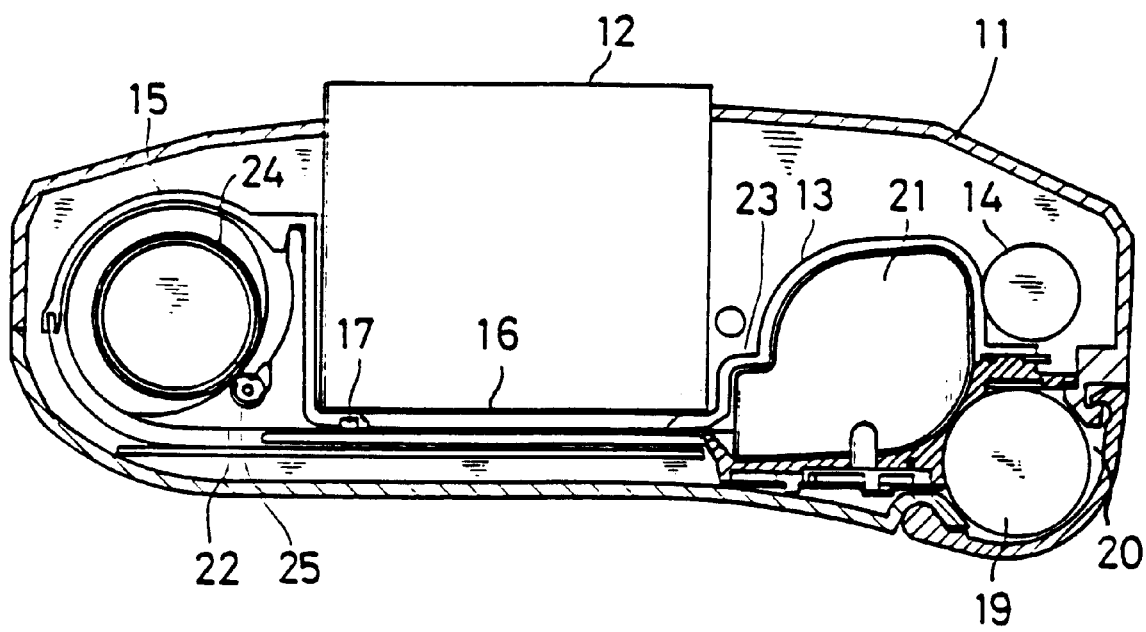
FIG. 1 is a schematic diagram showing an internal construction of a main body of a camera according to a first embodiment of the invention when viewed from above.
Figure 2:
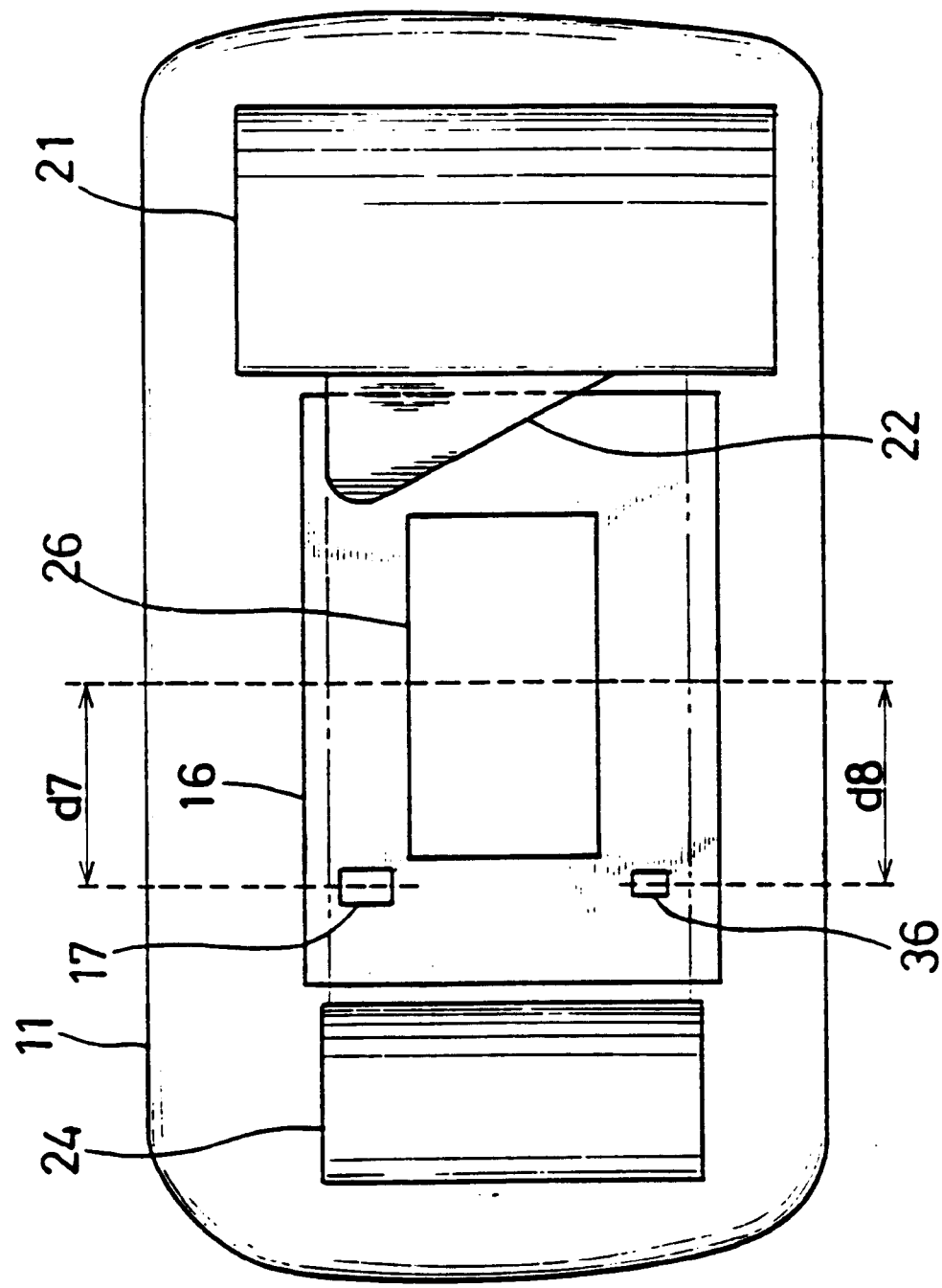
FIG. 2 is a schematic diagram showing an internal construction of the camera main body when viewed from behind.
Figure 3:
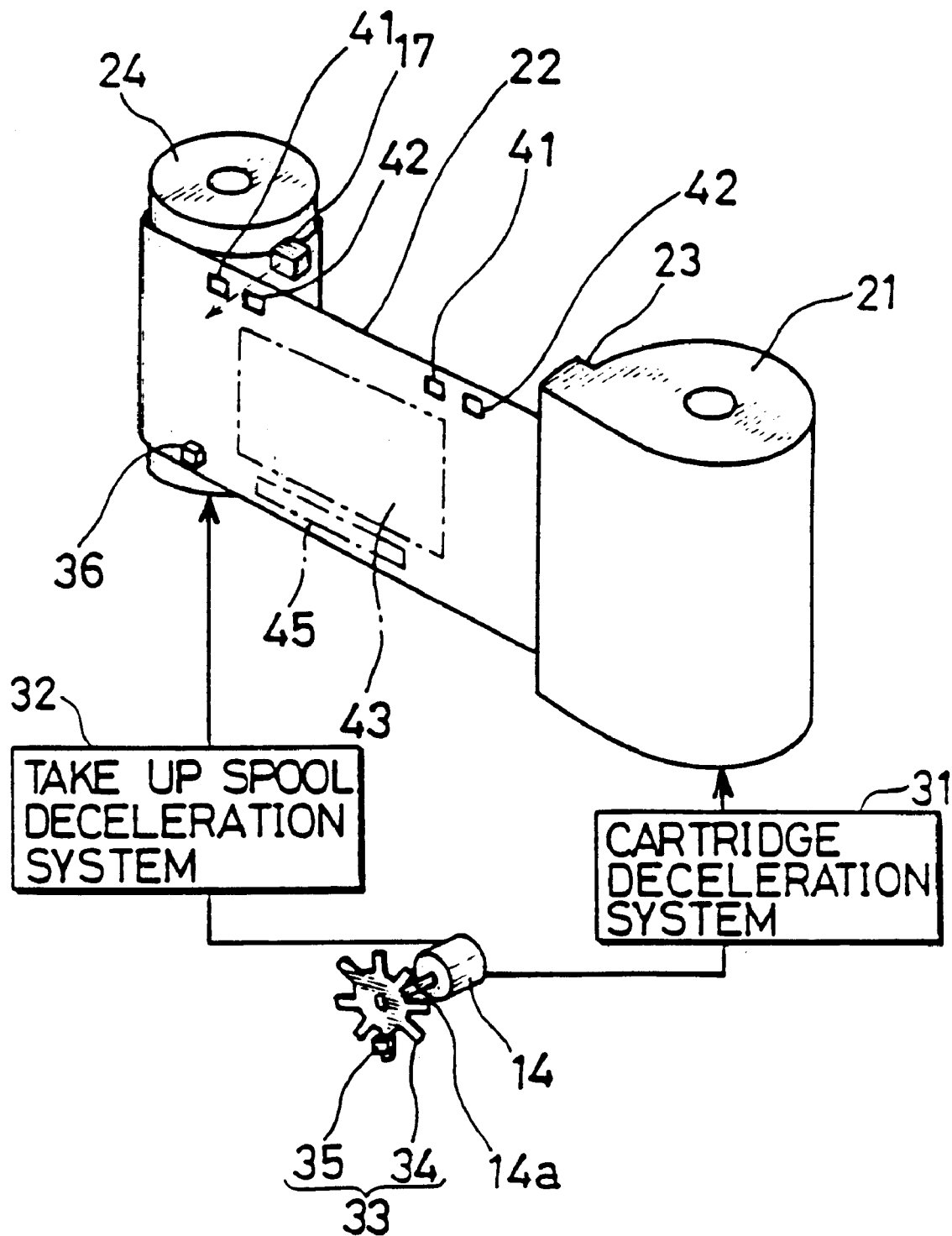
FIG. 3 is a construction diagram of a film feeding system according to the first embodiment.

A first embodiment of a camera according to the invention is described with reference to the accompanying drawings. FIGS. 1 and 2 are schematic diagrams showing the internal construction of a main body of the camera according to the first embodiment when viewed from above and behind, respectively. FIG. 3 is a construction diagram of a film feeding system.

A camera main body 11 is provided, as shown in FIG. 1, with a taking lens unit 12 including an unillustrated taking lens arranged substantially in the center of the camera main body 11, a cartridge chamber 13 arranged at the right side of the taking lens unit 12, a motor 14 arranged at the right side of the cartridge chamber 13 for driving a film, a film take-up chamber 15 arranged at the left side of the taking lens unit 12, an exposure frame 16 arranged behind the optic axis of the taking lens unit 12, a leading perforation sensor 17, and a battery chamber 20 arranged at a right end portion for accommodating a battery 19.

The cartridge chamber 13 is adapted to load a film cartridge 21. The film cartridge 21 is adapted to contain a film 22 inside and has a cylindrical shape as shown in FIG. 3. A film pull-out portion 23 projects at a side surface of the film cartridge 21 in parallel with an axis of the film cartridge 21. An unillustrated film outlet is provided at a leading end face of the film pull-out portion 23, and the film 22 is pulled out through the film outlet.

The film take-up chamber 15 is provided with a take-up spool 24 for winding the film 22 and a cylindrical film presser 25 which is so arranged as to be in contact with the outer surface of the take-up spool 24 with a specified pressure. The take-up spool 24 has a cylindrical shape as shown in FIG. 3 and is rotatably provided in the film take-up chamber 15.

As shown in FIG. 2, the exposure frame 16 is a laterally long frame and is provided with an exposure aperture 26 formed on the optic axis of the taking lens unit 12 (see FIG. 1). This exposure aperture 26 has a rectangular shape of a specified aspect ratio, and is adapted to restrict an exposure area of the film.

The leading perforation sensor 17 includes a photointerrupter, and controls the feed of the film by detecting perforations 41, 42 (see FIG. 4) formed in the film. The arrangement position of the leading perforation sensor 17 is described later.

The motor 14 is coupled with the film cartridge 21 and the take-up spool 24 via a cartridge deceleration system 31 and a take-up spool deceleration system 32, respectively as shown in FIG. 3. The deceleration systems 31, 32 include gears and are adapted to transmit a torque of the motor 14 to the film cartridge 21 and the take-up spool 24 at predetermined deceleration ratios.

A rotation sensor 33 is mounted on a shaft 14a of the motor 14 as shown in FIG. 3. The rotation sensor 33 is constructed by a pulse encoder including a disk 34 having detection pieces projecting at specified intervals from its periphery and a photointerrupter 35 for detecting the passage of these detection pieces, and is adapted to detected a rotating amount of the motor 14.

Alternatively, the rotation sensor 33 may be constructed by a pulse encoder including a disk having slits formed at specified intervals at its periphery and a photointerrupter for detecting the passage of these slits.

The camera main body 11 includes a magnetic head 36 arranged below and to the left of the exposure aperture 26. The magnetic head 36 is disposed to face the film 22 so as to record magnetic data as described later. The magnetic head 36 also reads the recorded magnetic data. When the film 22 contained in the film cartridge 21 is partially exposed, unexposed frames can be detected by detecting via the magnetic head 36 whether the magnetic data is recorded in a frame magnetic recording portion 45 (see FIG. 4). The arrangement position of the magnetic head 36 is described later.

The camera main body 11 is also provided with an unillustrated moving mechanism for moving the magnetic head 36 between a recording/reproducing position where the head surface of the magnetic head 36 is in contact with or close to the surface of the film 22 and a retracted position where the head surface of the magnetic head 36 is distanced from the surface of the film 22. The magnetic head 36 is brought into contact with the surface of the film 22 only when the magnetic data are recorded and read.

Figure 4:
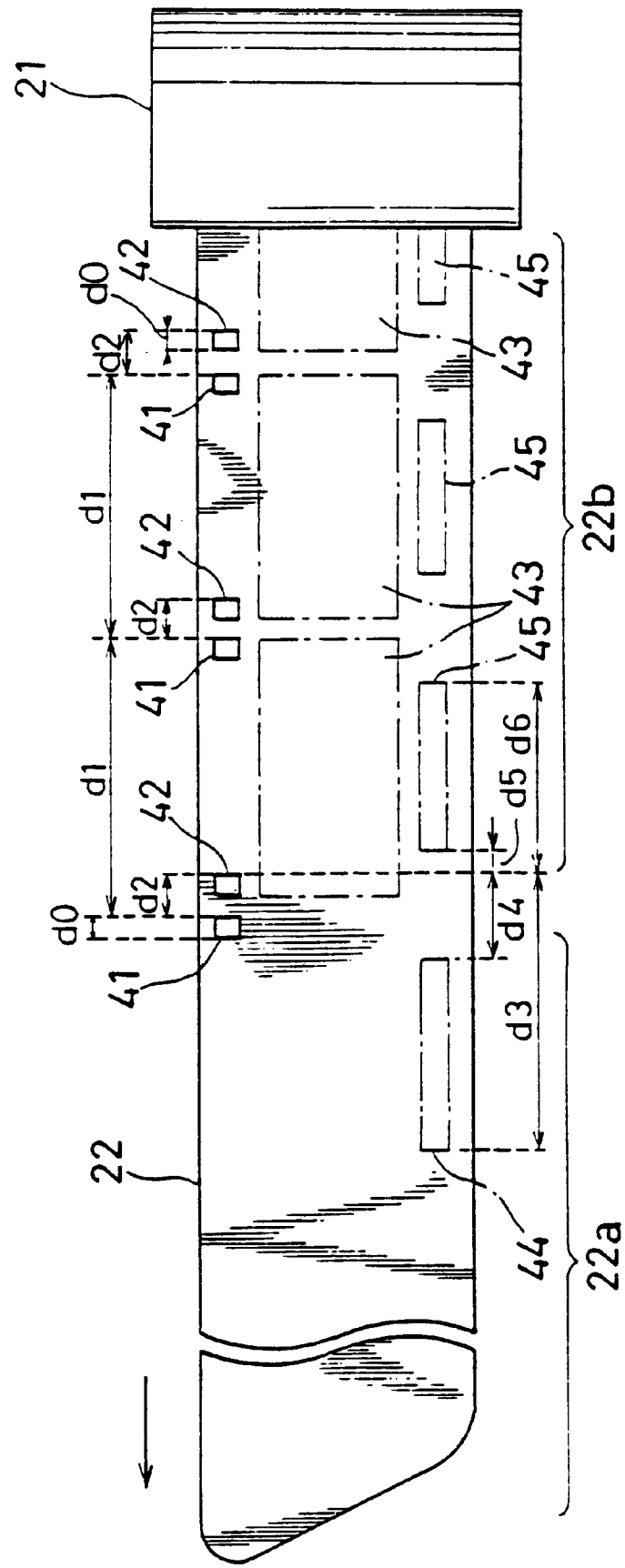
FIG. 4 is a diagram showing a configuration of a film.

FIG. 4 is a diagram showing the configuration of the film 22.

The film 22 includes three areas: a leader portion 22a, an exposure portion 22b and an unillustrated end portion in this order from the leading end thereof (left end in FIG. 4). The leader portion 22a is adapted to pull the film 22 out of the film cartridge 21. The exposure portion 22b is an area where a specified number of photographed images are recorded at specified intervals. The end portion is adapted to pull the film 22 out of the film cartridge 21 by a distance longer than a specified distance in order to enable the recording of a photographed image in the last frame of the exposure portion 22b.

At one end of the film 22 with respect to its widthwise direction (upper side in FIG. 4), pairs of perforations 41, 42 of identical rectangular shape are regularly formed. Frames 43 used for recording photographed images are provided between corresponding perforations 41 and 42.

The perforations 41, 42 are used as stop position references during the winding of the film 22 and as arrangement position references for the frames 43 and the magnetic recording portions 44, 45 to be described later, respectively, according to a method to be described below.

The dimension of the perforations 41, 42 along the film winding direction and a spacing between adjacent perforations 41 are set at d0 and d1, respectively. A spacing between each pair of perforations 41, 42 is set at d2 (where d2<d1−d2).

At the other end of the film 22 with respect to its widthwise direction, a leader magnetic recording portion 44 and a plurality of frame magnetic recording portions 45 are provided.

The leader magnetic recording portion 44 is provided in the leader portion 22a so as to record a title of the film and an information concerning the orientation of the photographed pictures with respect to the perforations.

The frame magnetic recording portions 45 are arranged in the vicinity of and below the respective frames 43 of the exposure portion 22b so as to record specified pieces of information concerning the photographed images such as a date of photographing, a framing information (vertically frame/horizontally framed), an exposure value, a magnification, an angle of view, a light source and the number of prints to be made.

The areas of the leader magnetic recording portion 44 and of the frame magnetic recording portions 45 are set based on distances from the right edges of the corresponding perforations 42. More specifically, the front and rear ends of the leader magnetic recording portion 44 are spaced apart from the right edge of the leading perforation 42 by distance d3 and distance d4, respectively. Further, the front and rear ends of each frame magnetic recording portion 45 are spaced apart from the right edge of the corresponding perforation 42 by distances d5 and d6, respectively.

Figure 5:
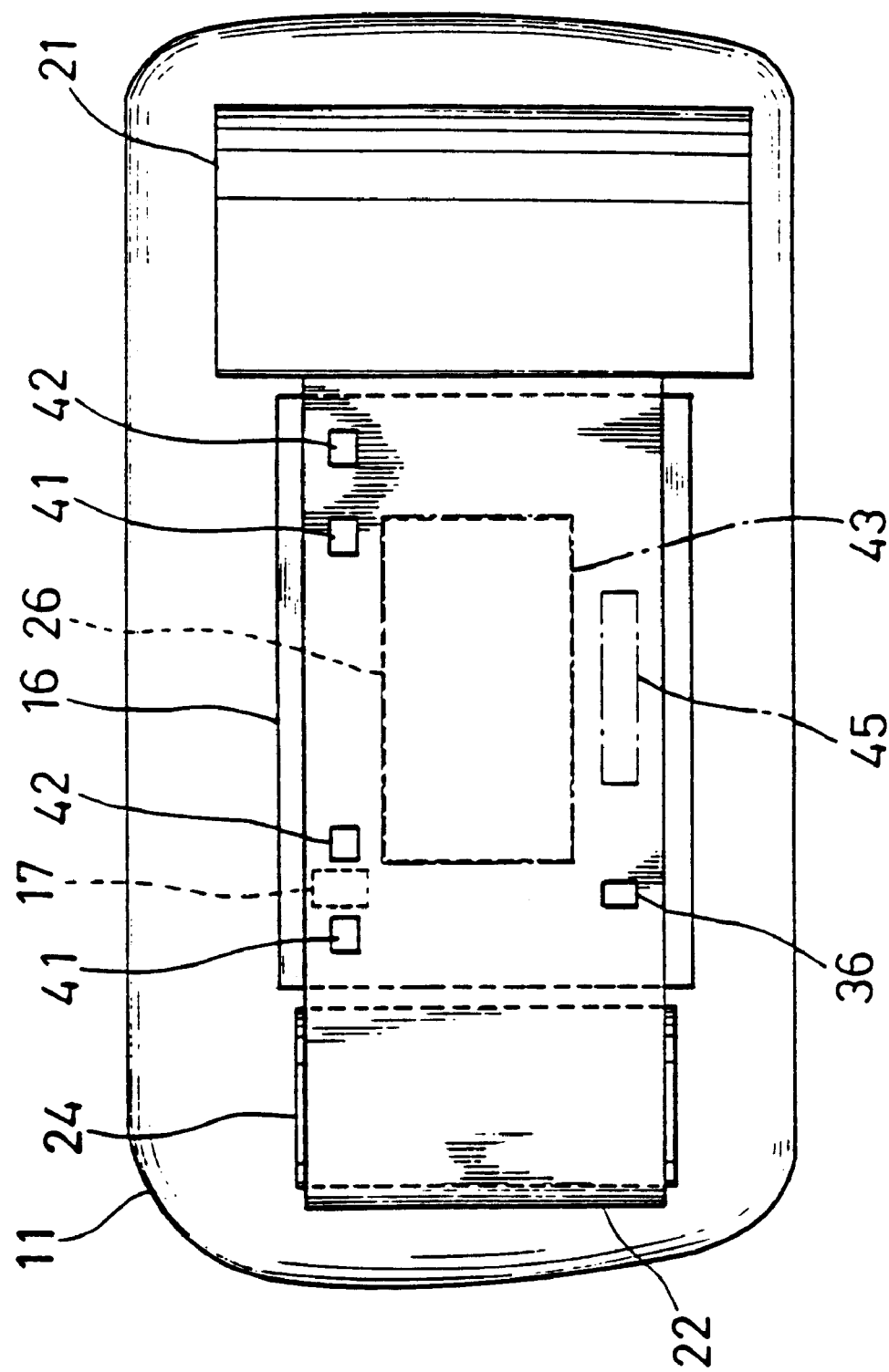
FIG. 5 is a schematic diagram showing a state where a film is wound around a take-up spool and one frame thereof is in an image recording position in FIG. 2.

Next, the arrangement positions of the leading perforation sensor 17 and the magnetic head 36 are described with reference to FIGS. 2 and 5. FIG. 5 is a diagram showing a state where the film 22 wound around the take-up spool 24 and one frame thereof is located in an image recording position in FIG. 2.

The leading perforation sensor 17 is located at a height where it can detect the passage of the perforations 41, 42 as shown in FIG. 5, and the detection point thereof is displaced forward from a center line of the exposure aperture 26 by distance d7 with respect to the film winding direction as shown in FIG. 2.

As shown in FIG. 5, the detection point of the leading perforation sensor 17 is located in the middle between the perforations 41, 42 when one frame of the film 22 is located in the image recording position. Further, a feed stop control in one frame feed of the film 22 after the photographing operation is performed by detecting the edge of the perforation 41 by the leading perforation sensor 17.

As shown in FIG. 2, the magnetic head 36 is displaced forward from the center line of the exposure aperture 26 by distance d8 with respect to the film winding direction and are at a height where the magnetic recording portions 44, 45 pass. In this embodiment, since d7=d8, the position of the magnetic head 36 coincides with that of the leading perforation sensor 17 with respect to the film feeding direction.

Figure 6:
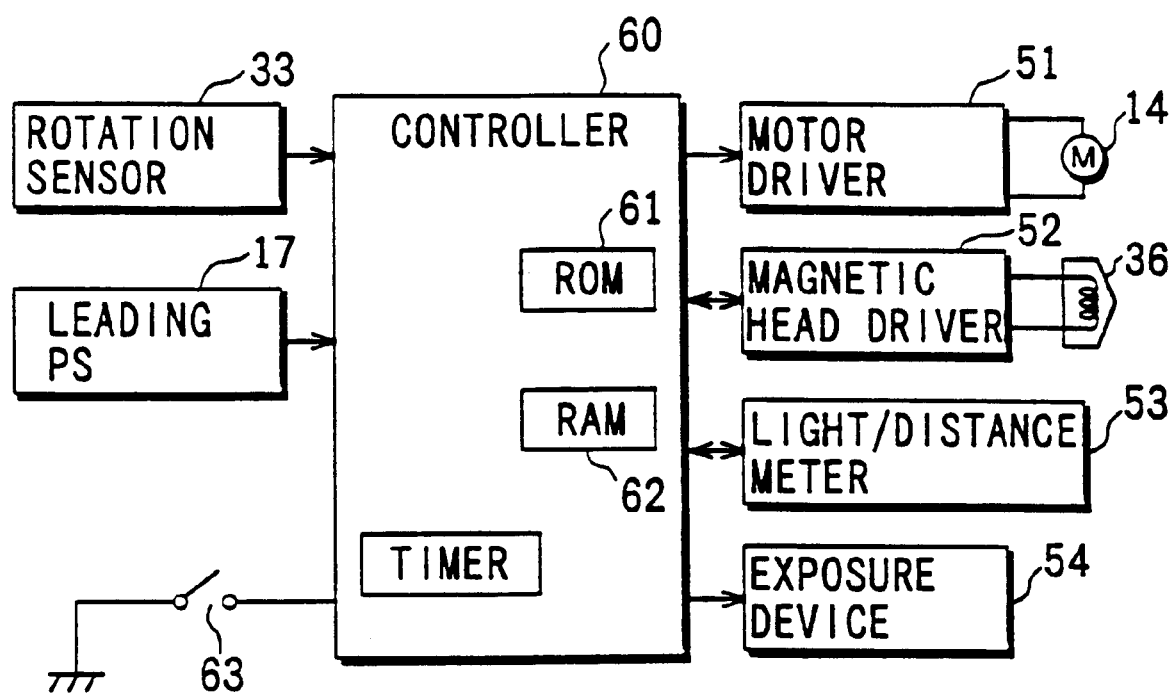
FIG. 6 is a block diagram of a control system for the camera according to the first embodiment.

FIG. 6 is a block diagram of a control system of the camera according to the first embodiment.

A motor driver 51 supplies a drive current to the motor 14. When the rotation of the motor 14 is to be stopped, the motor driver 51 applies plugging to the motor 14, i.e. reverses the connections of the motor 14 to stop the motor 14 within a short period of time. Depending upon the conditions, the motor driver 51 is also capable of applying a short-circuit braking by short-circuiting the opposite ends of the motor 14 and a natural braking (open-circuit braking) by disconnecting the opposite ends of the motor 14 in combination.

A magnetic head driver 52 intermittently supplies a current to the magnetic head 36 to cause the magnetic head 36 to record data in the magnetic recording portions 44, 45. A supply current is controlled by a controller 60. When the magnetic data is read by the magnetic head 36, it is magnetically picked up and sent to the controller 60.

A light/distance meter 53 measures a brightness of an object and a distance to the object. An exposure device 54 causes the film to be exposed based on the measurement results of the light/distance meter 53.

The controller 60 is constructed by a microcomputer or the like having a ROM 61, a RAM 62 and a timer function. The controller 60 controls the operation of the camera as shown in flowcharts of FIGS. 8 and 9 to be described later. The RAM 62 is adapted to temporarily store a variety of data.

The ROM 61 is adapted to store a control program and a table data used to obtain a film feed amount corresponding to one pulse of the rotation sensor 33 based on the present frame number of the film 22. More specifically, the diameter of the take-up spool 24 and the thickness of the film 22 are already known. Based on these two values, a ratio of the diameter of the take-up spool 24 without any film therearound and that of the take-up spool 24 after the film 22 is wound around it (hereinafter, "wind ratio") corresponding to the present frame number of the film 22 can be calculated. Further, the deceleration ratio of the take-up spool deceleration system 32 is also known. Based on the deceleration ratio and the wind ratio, the film feed amount per pulse of the rotation sensor 33 can be calculated as a function of the frame number of the film 22. The ROM 61 stores this function as a table data.

The controller 60 is connected with a shutter release switch 63. The shutter release switch 63 is provided in a specified position of the front surface of the camera main body 11 and is operated to perform a photographing operation. When the shutter release switch 63 is pressed, the controller 60 controls the operations of the above elements.

Figure 7:
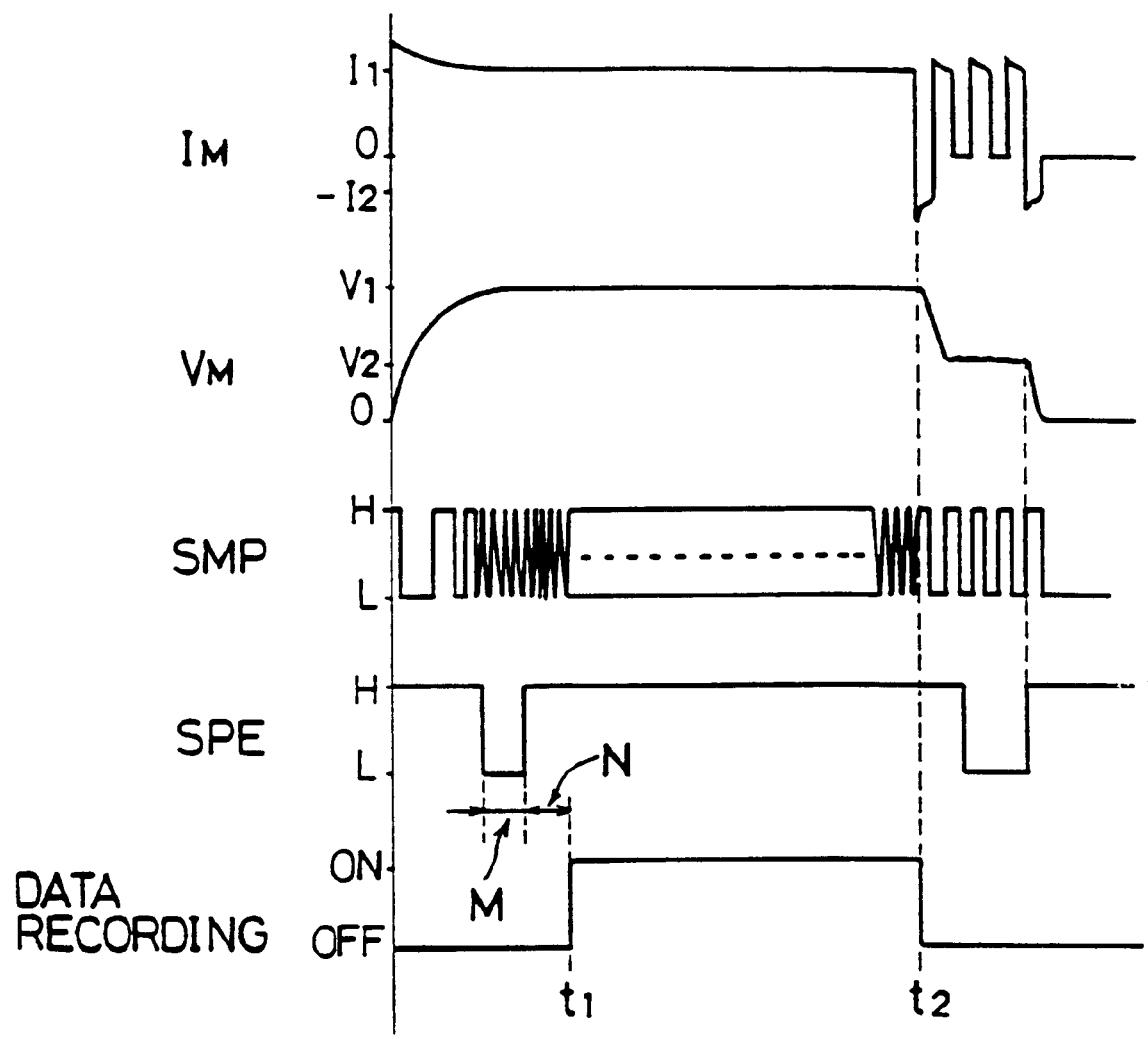
FIG. 7 is a timing chart showing the states of the respective elements in the first embodiment.
Figure 8:
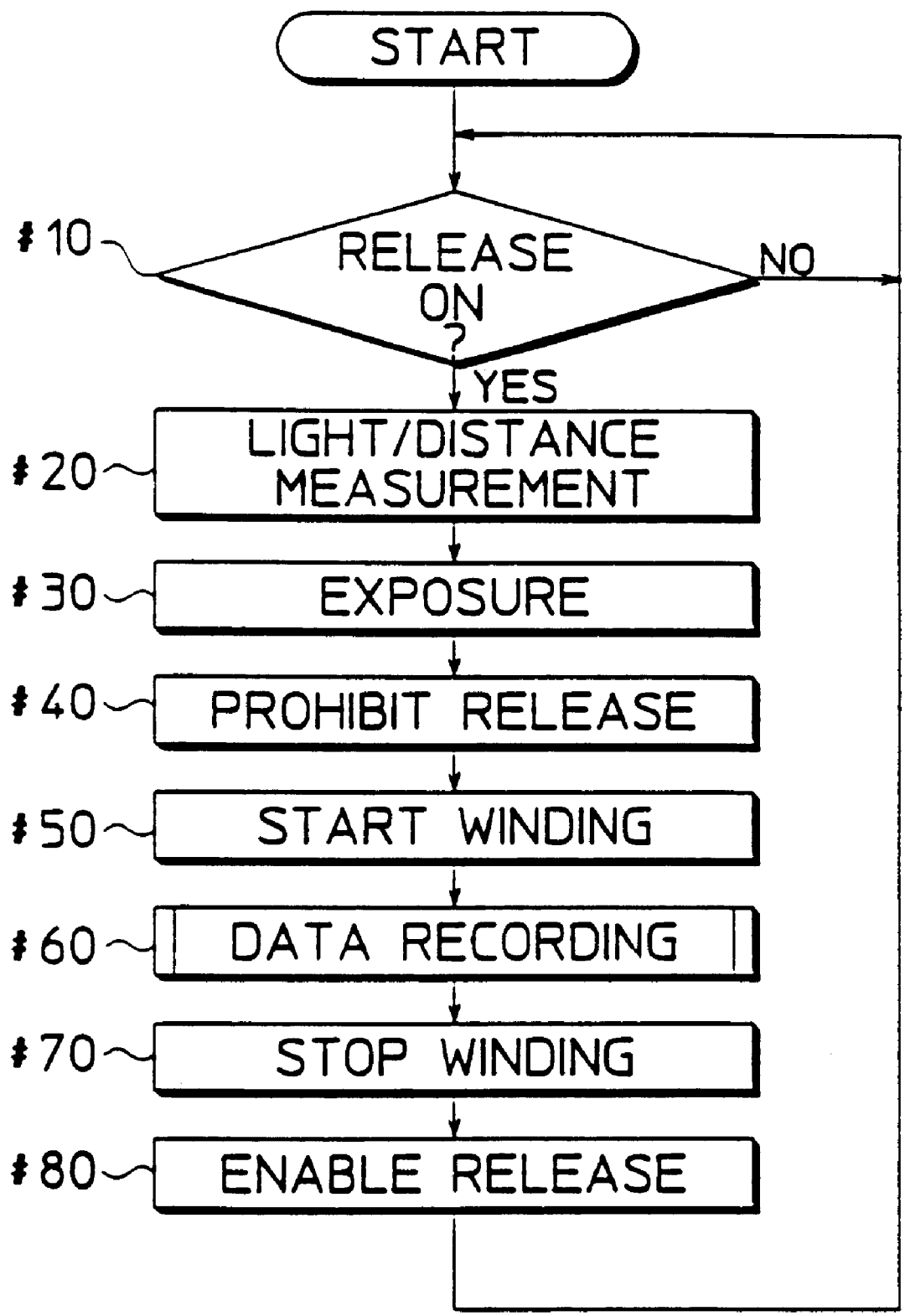
FIG. 8 is a flowchart of a main routine according to the first embodiment.
Figure 9:
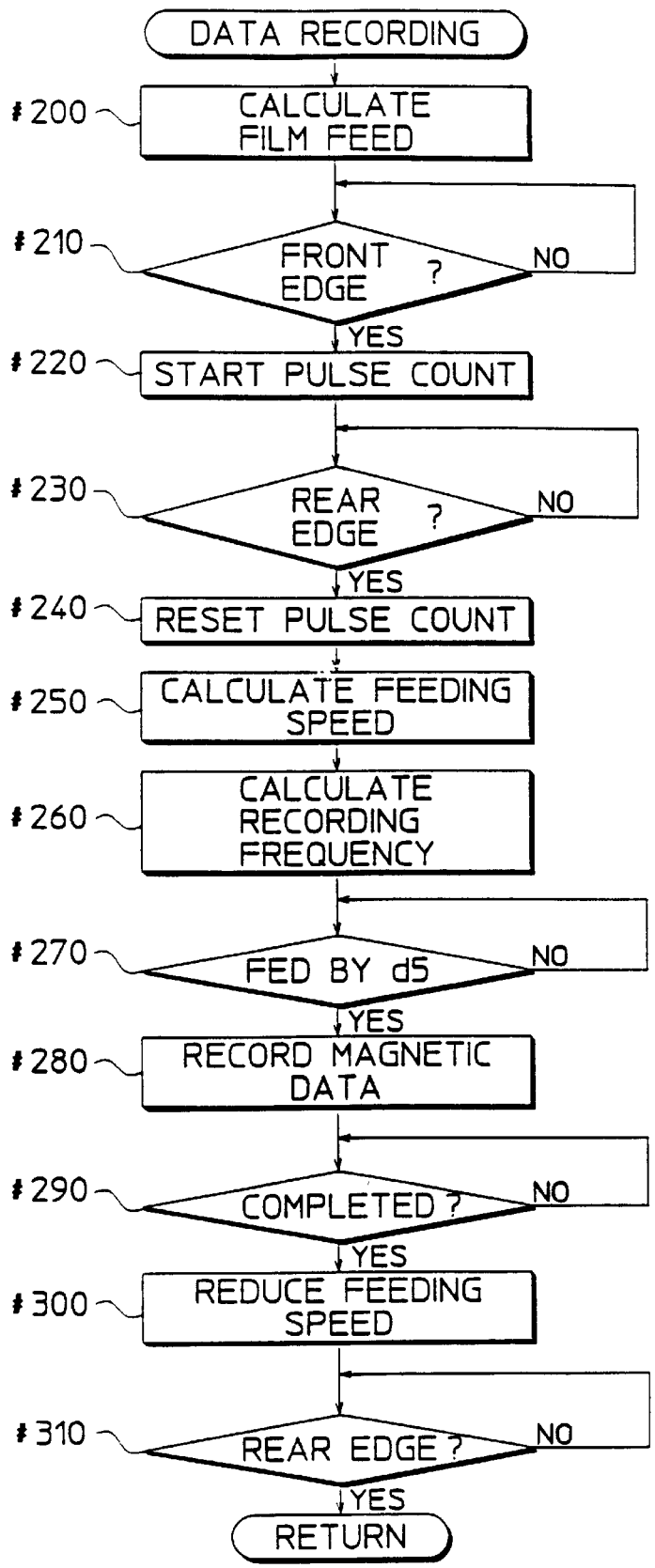
FIG. 9 is a flowchart of a subroutine "Data Recording" executed in Step #160 of FIG. 8.

Next, the operation of the camera is described with reference to the flowcharts of FIGS. 8 and 9 as well as a timing chart of FIG. 7. FIG. 7 is a timing chart showing the states of the respective elements; FIG. 8 is a flowchart showing a main routine; and FIG. 9 is a flowchart showing a subroutine "Data Recording" executed in Step #60 of FIG. 8.

First, it is discriminated whether the shutter release switch 63 is on (Step #10). If the shutter release switch 63 is off (NO in Step #10), the main routine waits on standby. At this stage, the film 22 is positioned as shown in FIG. 5.

On the other hand, if the shutter release switch 63 is on (YES in Step #10), a light measurement and a distance measurement are performed (Step #20). Subsequently, an exposure is made to the film 22 (Step #30). Upon the completion of the exposure, the response to the shutter release switch 63 is prohibited (Step #40) and the winding is started (Step #50).

More specifically, as shown in FIG. 7, the supply of a current $I_M$ to the motor 14 is started. A rotating speed $V_M$ of the motor 14 increases to its steady speed. Accordingly, the pulse duration of a sensor signal SMP of the rotation sensor 33 is shortened and the motor 14 is driven at a fixed rotating speed $V_1$.

Subsequently, the subroutine "Data Recording" of FIG. 9 is called (Step #60).

First, with reference to the table data stored in the ROM 61, a film feed amount per pulse of the sensor signal SMP of the rotation sensor 33 is calculated based on the present frame number of the film 22. A pulse number N of the sensor signal SMP necessary to feed the film 22 by a distance d5 (see FIG. 4) is calculated based on the calculated film feed amount and the distance d5 (Step #200).

Upon the detection of the front edge of the perforation 42 by the leading perforation sensor 17 (YES in Step #210), the count of the pulse number of the sensor signal SMP is started (Step #220). Upon the detection of the rear edge of the perforation 42 by the leading perforation sensor 17 (YES in Step #230), the counted pulse number of the sensor signal SMP is reset (Step #240) and an average feeding speed of the film 22 is calculated based on the counted pulse number M immediately before the reset (Step #250). In other words, the film feeding speed is calculated based on the dimension d0 of the perforation 42 and the pulse number M of the sensor signal SMP output while the film 22 is fed by d0.

Subsequently, a recording frequency of the magnetic data is calculated based on the calculated film feeding speed (Step #260). This calculation is made for the following reason. The film feeding speed varies depending upon how much the battery is used up and other factors. On the other hand, an amount of data to be recorded (bit number) is predetermined. Accordingly, by calculating the recording frequency, the magnetic data can be recorded in the magnetic recording portions 45 of the film 22, i.e. in an area defined by a distance (d6–d5) shown in FIG. 4 at a proper bit density.

It is then determined whether the film 22 has been fed by d5 (see FIG. 4) after the detection of the rear edge in Step #230 (Step #270). In other words, it is discriminated whether the pulse number of the sensor signal SMP being counted after the detection of the rear edge in Step #230 has reached the calculated pulse number N.

When the film is fed by d5 (YES in Step #270), the magnetic data are recorded (Step #280). This data recording is continued (NO in Step #290) until the recording of a specified magnetic data is completed. Upon the completion of the magnetic data recording (YES in Step #290), the rotating speed of the motor 14 is decelerated, thereby reducing the film feeding speed (Step #300).

Specifically, as shown in FIG. 7, the recording of the magnetic data is started at time t1 and completed at time t2. At time t2, the current $I_M$ supplied to the motor 14 is inverted to brake the motor 14 so as to reduce the rotating speed of the motor 14 to $V_2$ ($<V_1$). After the rotating speed is reduced to $V_2$, the current supply to the motor 14 is on-off controlled at a specified duty ratio so as to substantially hold the rotating speed at $V_2$. The rotating speed $V_2$ is attainable by controlling the pulse number of the sensor signal SMP of the rotation sensor 33 per unit time to be a predetermined value.

The driving of the motor 14 at the decelerated rotating speed is continued (NO in Step #310) until the rear edge of the perforation 41 is detected. Upon the detection of the rear edge (YES in Step #310), a reentry to the main routine of FIG. 8 is made.

The rotation of the motor 14 is stopped by inverting the current $I_M$ supplied to the motor 14 to $-I_2$ as shown in FIG. 7 so as to stop the winding of the film 22 (Step #70). At this stage, the film 22 is positioned as shown in FIG. 5 after being fed by one frame. Subsequently, the response to the shutter release switch 63 is enabled (Step #80) and this main routine returns to Step #10, waiting for the shutter release switch 63 to be pressed.

As described above, the leading perforation sensor 17 is located between the perforations 41, 42 when the film 22 is in the image recording position, and the recording of the magnetic data is started after counting a specified number of pulses of the rotation sensor 33 following the detection of the rear edge of the leading perforation 42. Accordingly, the recording of the magnetic data can securely be started within the set magnetic recording portion 45.

The feeding speed of the film 22 is calculated by counting the pulse number of the rotation sensor 33 during the passage of the perforation 42 and the recording frequency of the magnetic data is determined according to the calculated feeding speed. Accordingly, the magnetic data can be accurately recorded within the preset magnetic recording portion 45 at a proper bit density.

Since the film 22 is fed without turning the motor 14 on and off during the recording of the magnetic data, it can be fed at a constant speed by preventing the feeding speed from varying due to a variation of a current to be consumed. This prevents a variation in the bit density (or recording length) of the magnetic data. Therefore, the magnetic data can accurately be read.

Further, since the feeding speed of the film 22 is reduced after the recording of the magnetic data is completed, the feed of the film 22 can be stopped within a short period of time after the detection of the rear edge of the perforation 41. Accordingly, the feed of the film 22 can accurately be stopped.

The rotating speed $V_2$ is set such that the feed of the film 22 is stopped within a short period of time after the start of deceleration in Step #170 and the frame 43 of the film 22 can accurately be positioned with respect to the exposure aperture 26 as shown in FIG. 5.

In the first embodiment, since d7=d8, the position of the magnetic head 36 coincides with that of the leading perforation sensor 17 with respect to the film feeding direction. If d7≠d8, a pulse number corresponding to a distance (d5+d8−d7) taking the distance between the leading perforation sensor 17 and the magnetic head 36 into account may be calculated in Step #200.

As described above, according to the first embodiment, since the perforation sensor is provided in the specified position, when the perforation is detected after the start of the film winding, the magnetic recording area provided in a position spaced apart from this detected perforation by a specified distance along the length of the film can securely be detected.

Further, the perforation sensor is provided forward, along the film winding direction, of the position where it faces the perforation when the corresponding frame of the film is in the image recording position, the perforation can detected immediately after the start of the film winding. Accordingly, the magnetic recording area provided in the position spaced apart from this detected perforation by the specified distance along the length of the film can securely be detected.

Furthermore, the feed amount of the film is detected, and the data recording by the magnetic head is started when the feed amount of the film along the film winding direction after the detection of the rear edge of the perforation reaches a predetermined value during the winding of the film. Accordingly, the data can be accurately recorded within the magnetic recording area.

Figure 10:
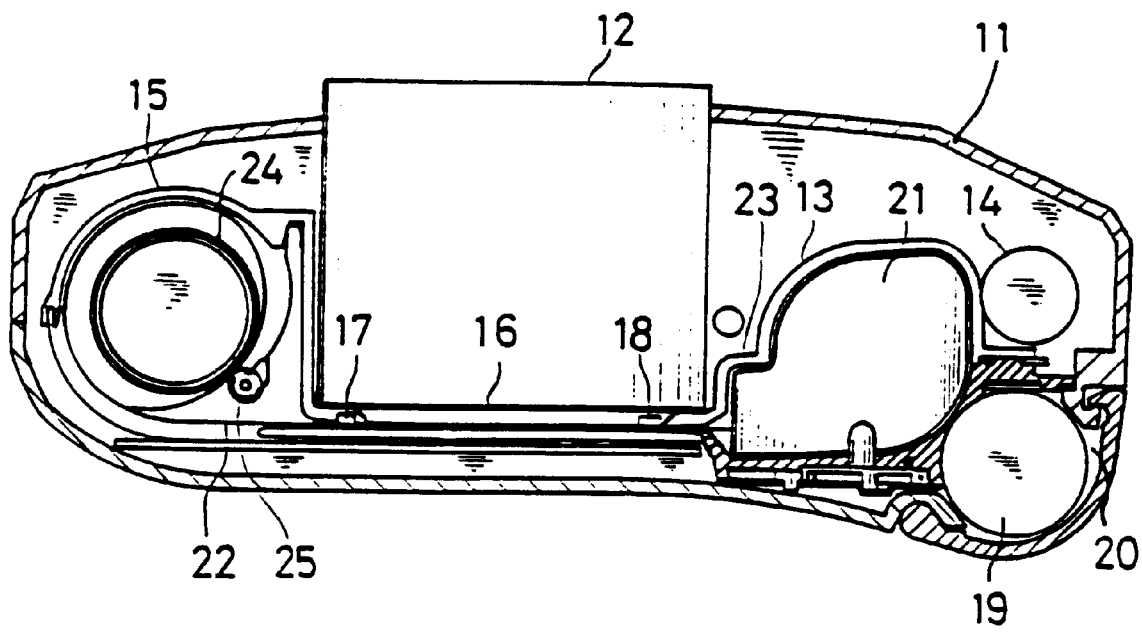
FIG. 10 is a schematic diagram showing an internal construction of a main body of a camera according to a second embodiment of the invention when viewed from above.
Figure 11:
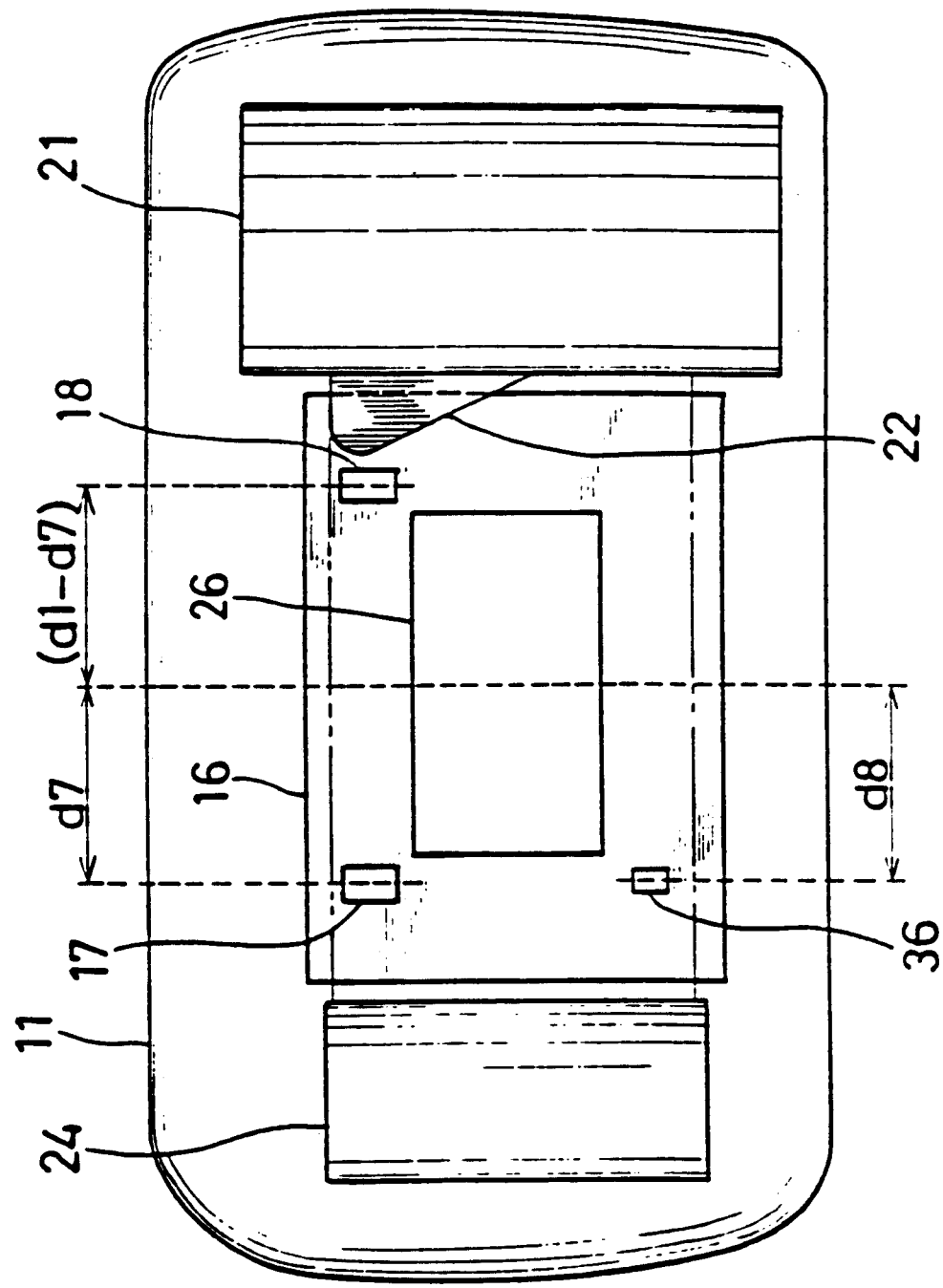
FIG. 11 is a schematic diagram showing an internal construction of the camera main body when viewed from behind.
Figure 12:
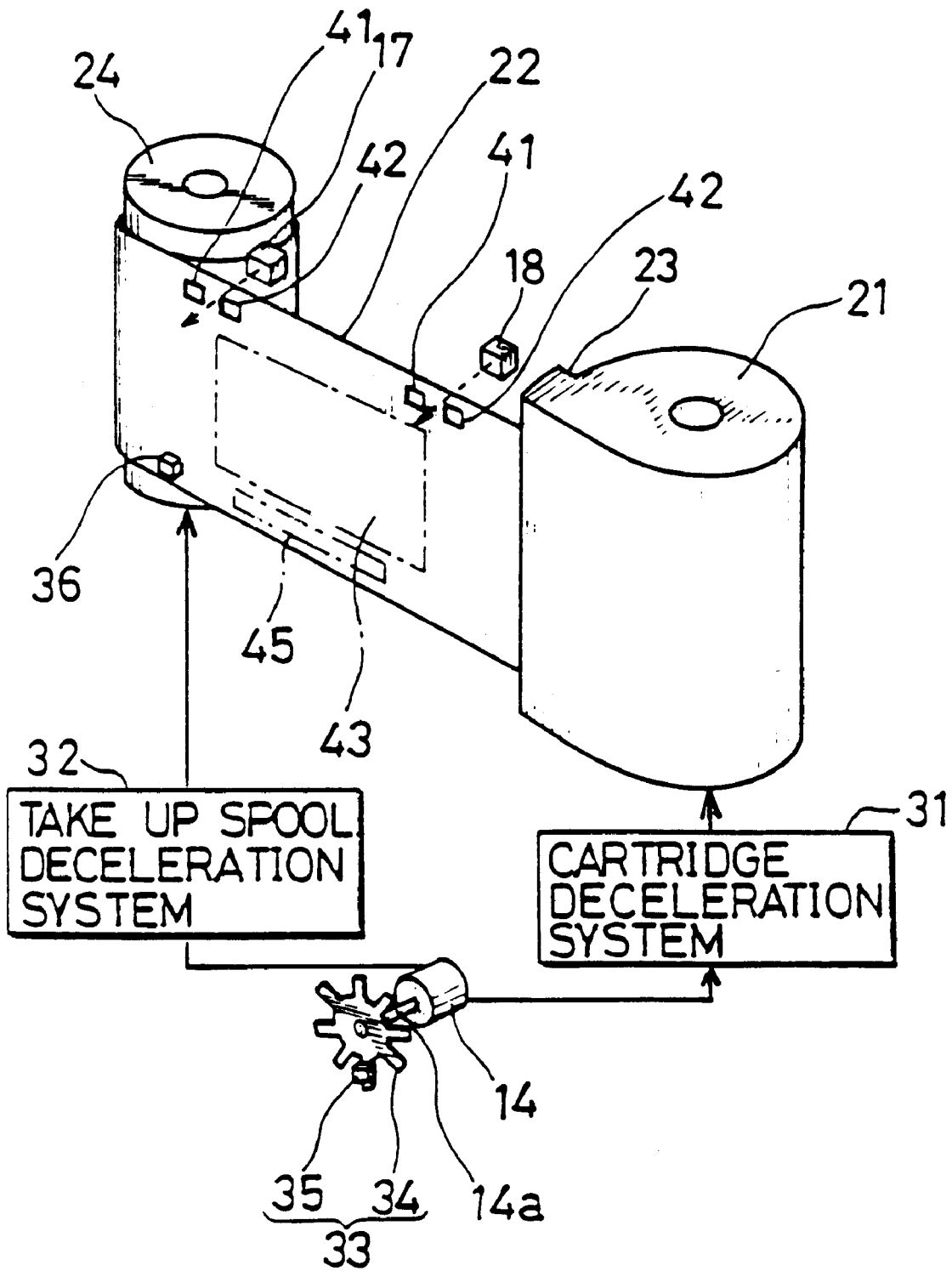
FIG. 12 is a construction diagram of a film feeding system according to the second embodiment.

Next, a second embodiment of the invention is described. FIGS. 10 and 11 are schematic diagrams showing the internal construction of a main body of a camera according to the second embodiment when viewed from above and behind, respectively. FIG. 12 is a perspective diagram showing a film feeding system according to the second embodiment. The same elements as the first embodiment are identified by the same reference numerals.

A camera main body 11 according to the second embodiment is provided with a second perforation sensor (hereinafter, second PS) 18 in addition to the leading perforation sensor (hereinafter, first PS) 17 of the first embodiment as shown in FIG. 10.

Similar to the first PS 17, the second PS 18 is constructed by a photointerrupter and controls the feed of the film by detecting perforations 41, 42 (see FIG. 4) formed in the film.

Figure 13:
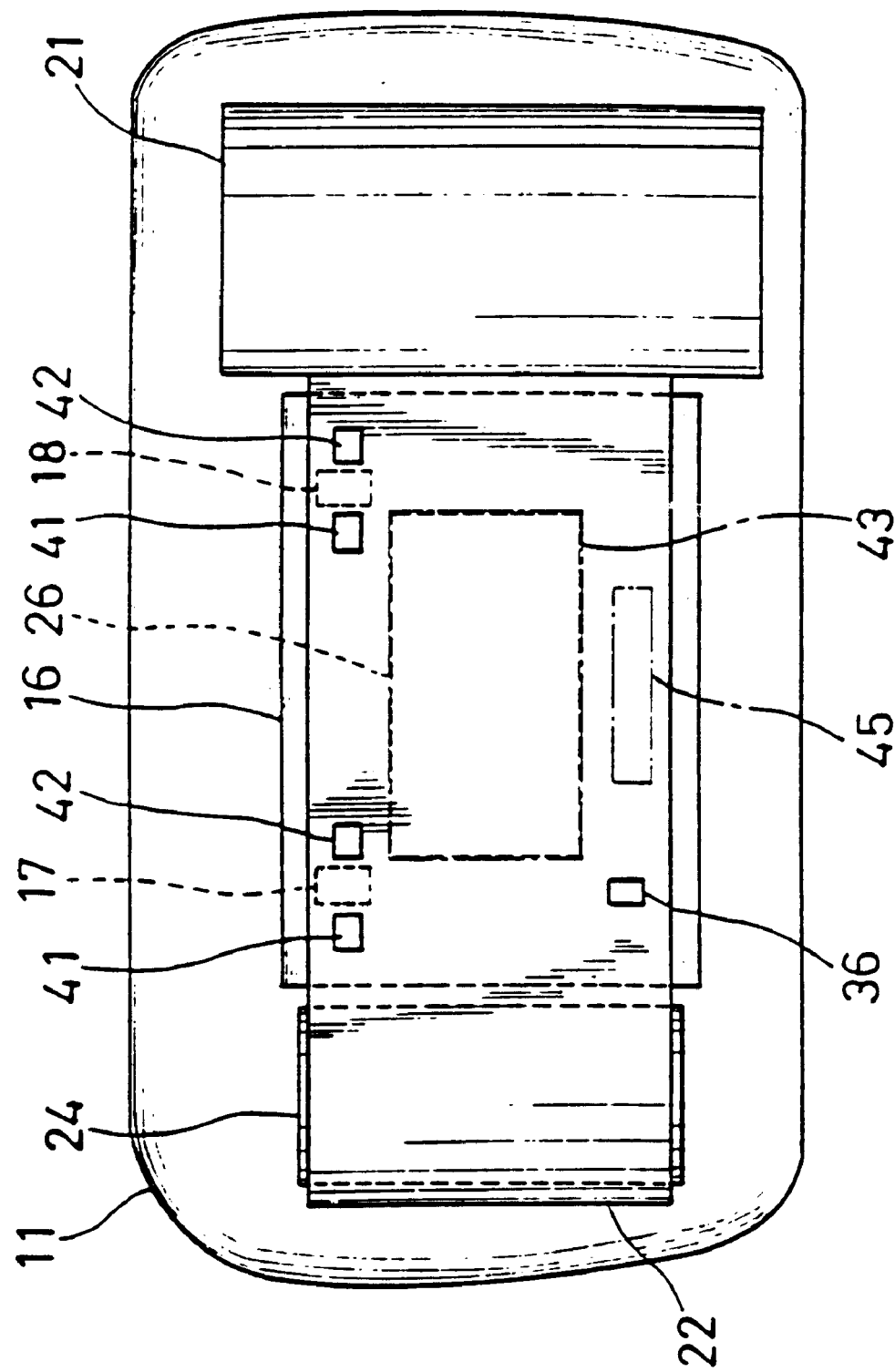
FIG. 13 is a schematic diagram showing a state where a film is wound around a take-up spool and one frame thereof is in an image recording position in FIG. 11.

Next, with reference to FIGS. 11 and 13, the arrangement positions of the first and second PSs 17, 18 and a magnetic head 36 are described. FIG. 13 is a diagram, similar to FIG. 11, showing a state where a film 22 is wound around a take-up spool 24 and one frame thereof is positioned in an image recording position.

The first PS 17 is located at a height where it can detect the passage of the perforations 41, 42 as shown in FIG. 13, and the detection point thereof is displaced forward from a center line of the exposure aperture 26 by distance d7 with respect to the film winding direction as shown in FIG. 11.

As shown in FIG. 13, the detection point of the leading perforation sensor 17 is located in the middle between the perforations 41, 42 when one frame of the film 22 is located in the image recording position. Further, a feed stop control when the film 22 is fed by one frame after the photographing operation and when the recorded magnetic data is changed is performed by detecting the edge of the perforation 41 by the first PS 17.

Further, the second PS 18 is located at a height where it can detect the passage of the perforations 41, 42 as shown in FIG. 13, and the detection point thereof is located in a position displaced backward from the center line of the exposure aperture 26 by distance (d1–d7) with respect to the film winding direction.

As shown in FIG. 13, the detection point of the second PS 18 is located in the middle between the perforations 41, 42 adjacent to and behind the first PS 17 when one frame of the film 22 is located in the image recording position. Further, a feed control during the recording of magnetic data in a leader magnetic recording portion 44 is performed as described later by detecting the edges of the perforations 41, 42 by the first and second PSs 17, 18.

The magnetic head 36 is located in a position displaced forward from the center line of the exposure aperture 26 by distance d8 with respect to the film winding direction as shown in FIG. 11, and at a height where magnetic recording portions 44, 45 pass. In this embodiment, d7=d8, i.e. the position of the second PS 18 coincides with that of the first PS 17 with respect to the film feeding direction.

Figure 14:
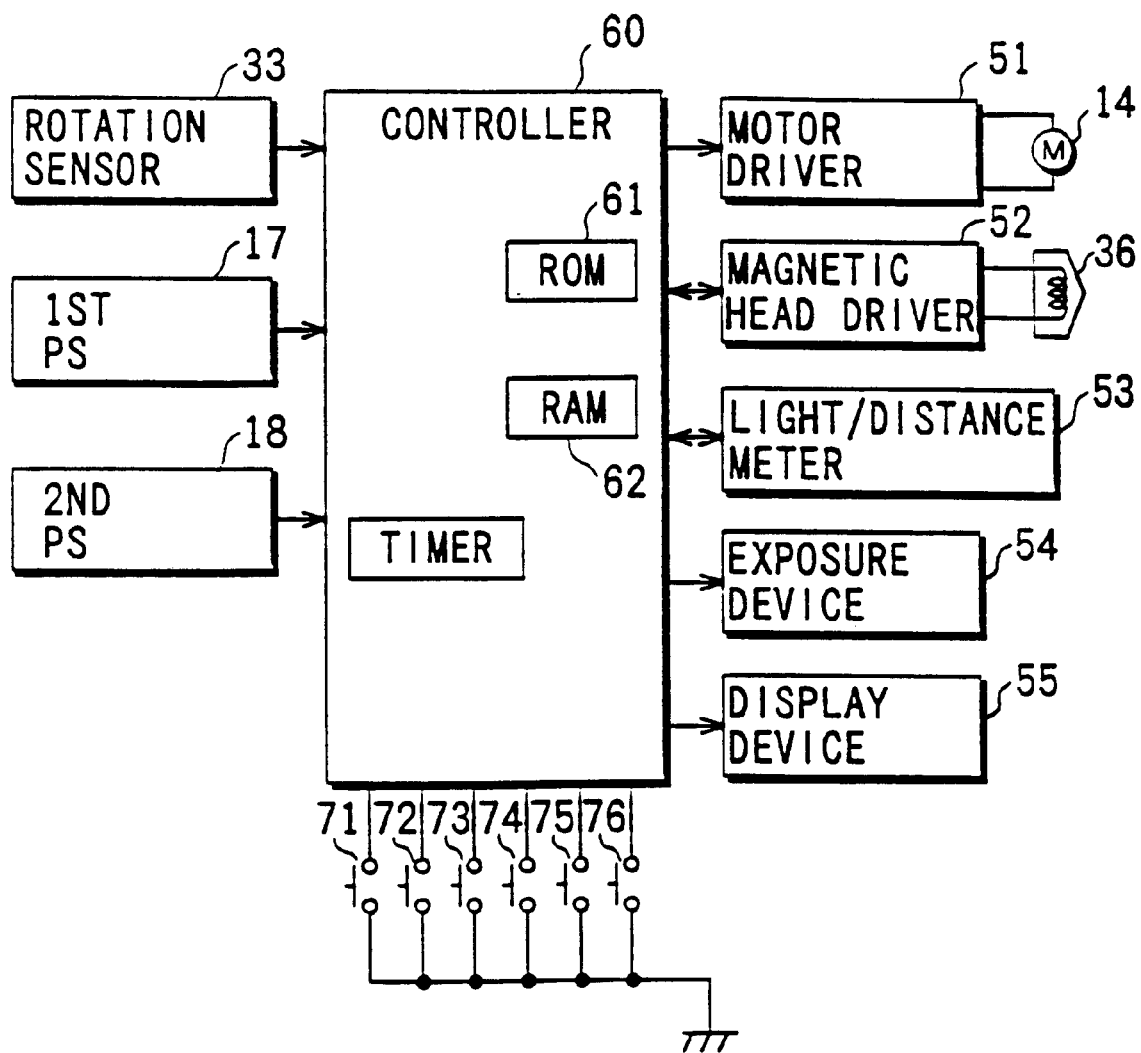
FIG. 14 is a block diagram of a control system for the camera according to the second embodiment.
Figure 15:
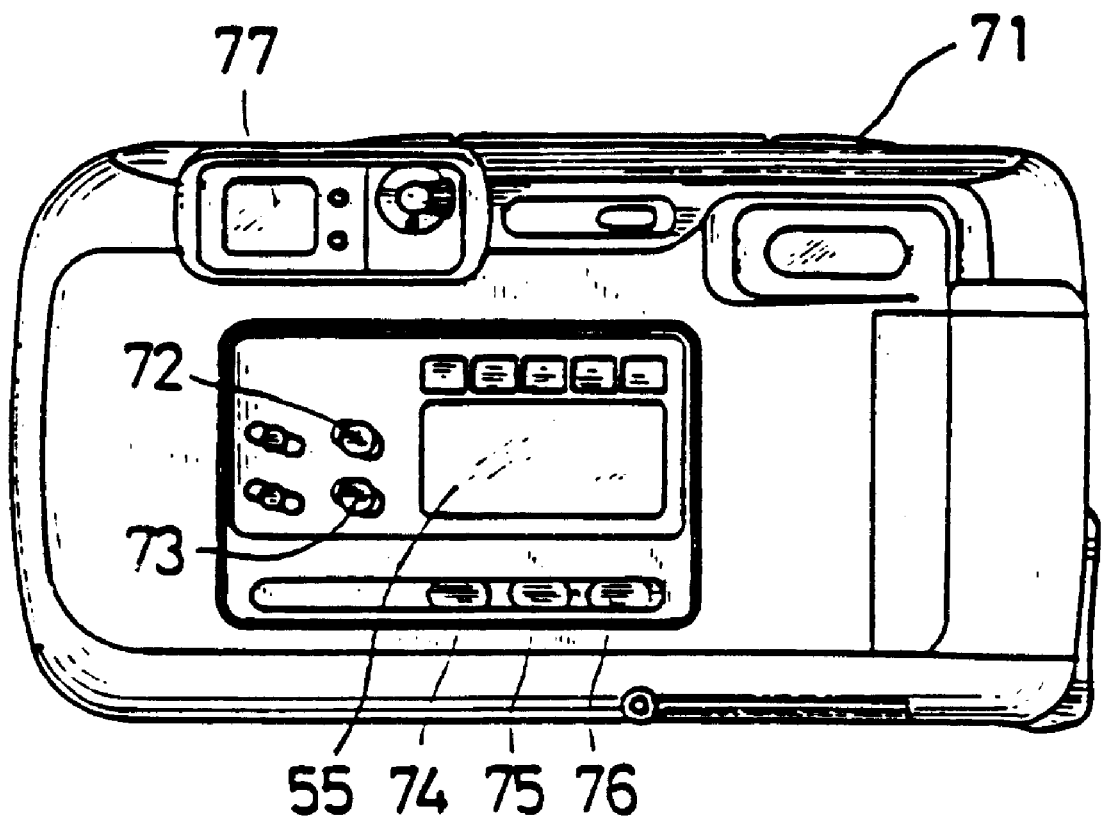
FIG. 15 is a rear view of the camera main body according to the second embodiment.

FIG. 14 is a block diagram showing a control system, and FIG. 15 is a rear view of the camera main body 11.

A display device 55 is constructed by a LCD panel or the like and is arranged substantially in the center of the back surface of the camera main body 11 as shown in FIG. 15. A variety of data including an information as to whether the film is loaded or not are displayed as described later.

A controller 60 is constructed by a microcomputer or the like having a ROM 61, a RAM 62 and a timer function. The controller 60 controls the operation of the camera as shown in flowcharts of FIGS. 16, 9, 17 and 19 to be described later. The RAM 62 is adapted to temporarily store a variety of data. The same data as the one recorded in the frame magnetic recording portion 45 is stored in the RAM 62.

The ROM 61 is adapted to store a control program and a table data used to obtain a film feed amount corresponding to one pulse of a rotation sensor 33 based on a present frame number of the film 22. More specifically, the diameter of a take-up spool 24 and the thickness of the film 22 are already known. Based on these two values, a wind ratio of the diameter of the take-up spool 24 without any film therearound and that of the take-up spool 24 after the film 22 is wound around it which ratio corresponds to the present frame number of the film 22 can be calculated. Further, the deceleration ratio of a take-up spool deceleration system 32 is also known. Based on the deceleration ratio and the wind ratio, the film feed amount per pulse of the rotation sensor 33 can be calculated as a function of the frame number of the film 22. The ROM 61 stores this function as a table data.

To the controller 60 are connected a shutter release switch 71, a frame data changing mode switch 72, a leader data setting mode switch 73, a view size setting switch 74, a data content selection scroll switch 75 and a data content determining switch 76. As shown in FIG. 15, the shutter release switch 71 is arranged in a specified position on the upper surface of the camera main body 11, whereas the other switches 72 to 76 are arranged in specified positions around the display device 55 on the back surface of the camera main body 11. The controller 60 controls the operation of the respective elements in accordance with the states of the respective switches.

The shutter release switch 71 is operated to perform a photographing operation. The frame data changing mode switch 72 is operated to instruct a data change in the frame magnetic recording portion 45, whereas the leader data setting mode switch 73 is operated to instruct a data setting in the leader magnetic recording portion 44.

When the switches 72, 73 are operated, a list of selectable data is displayed in the display device 55 and one data is selectable by means of a cursor.

The view size setting switch 74 is operated to set a view size such as a panorama size, "16:9" or "4:3". A camera operator can set the view size while viewing through a viewfinder 77.

Each time the data content selection scroll switch 75 is operated, the cursor provided to select one of the listed data displayed in the screen of the display device 55 is scrolled. The data content determining switch 76 is operated to determine the data pointed by the cursor when it is operated as a selected data.

Figure 16:
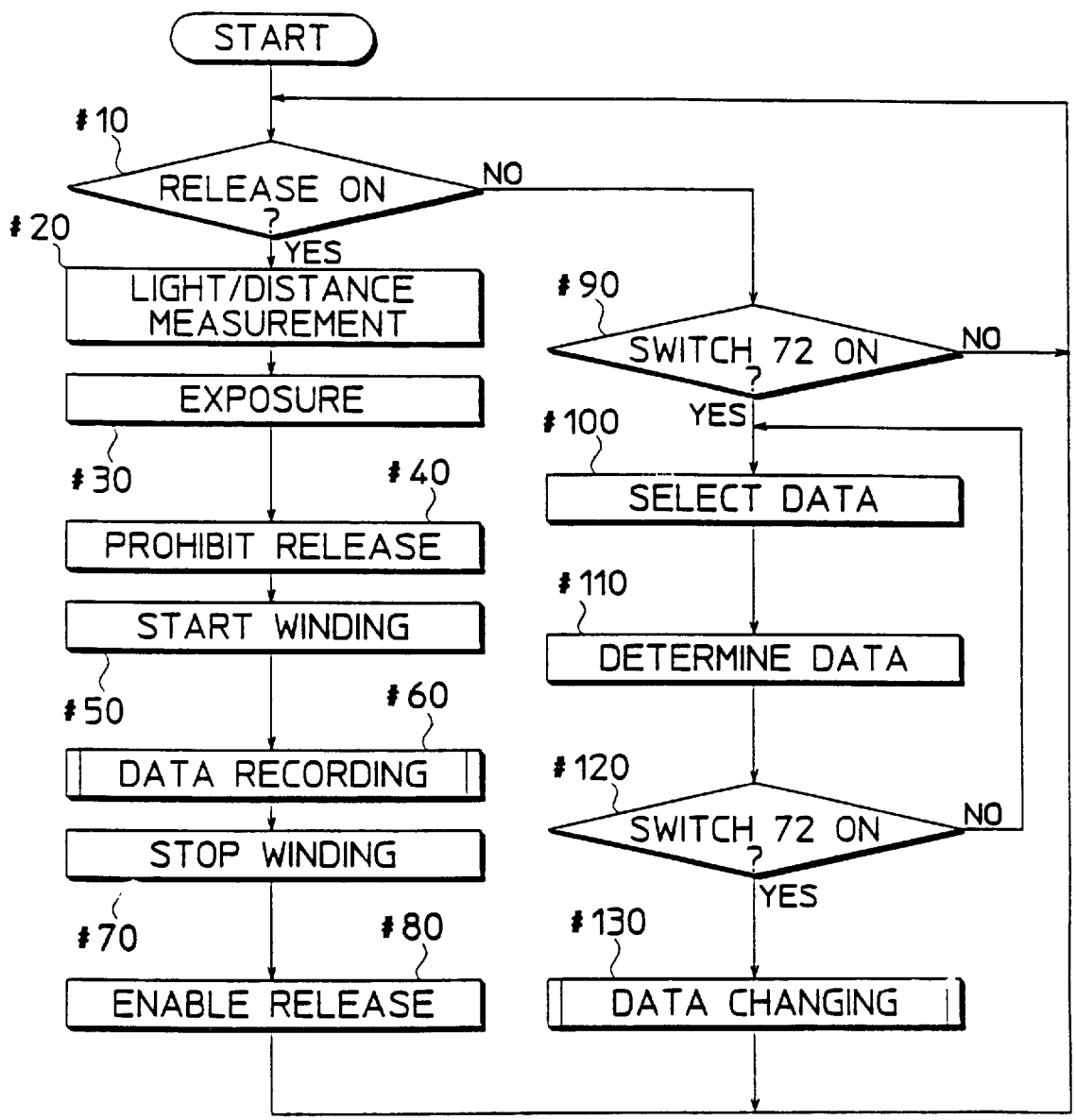
FIG. 16 is a flowchart of a main routine according to the second embodiment.

Next, with reference to a flowchart of FIG. 16, the recording of the magnetic data is described. FIG. 16 shows a main routine.

First, it is determined whether the shutter release switch 71 is on (Step #10). At this stage, the film 22 is positioned as shown in FIG. 13.

If the shutter release switch 71 is on (YES in Step #10), Step #20 follows. Since Steps #20 to #80 are the same as those of the first embodiment, no description is given thereon.

On the other hand, if the shutter release switch 71 is off (NO in Step #10), it is determined whether the frame data changing mode switch 72 is on (Step #90). The main routine returns to Step #10 if the switch 72 is off (NO in Step #90).

If the switch 72 is on (YES in Step #90), the cursor is scrolled by operating the data content selection scrolling switch 75 to select the data (Step #100). Subsequently, the data pointed by the cursor is determined as a selected data by operating the data content determining switch 76 (Step #110).

It is then determined again whether the frame data changing mode switch 72 is on (Step #120). If the switch 72 is off (NO in Step #120), the selection and determination of a different data is enabled by repeating Steps #100 and #110.

When the switch 72 is turned on (YES in Step #120), the main routine returns to Step #10 after the execution of a subroutine "Data Changing" to be described later (Step #130).

The first PS 17 is located in the middle between the perforations 41 and 42 when one frame of the film 22 is located in the image recording position as shown in FIG. 5, and the recording of the magnetic data is started upon counting a specified number of pulses of the rotation sensor 33 after the detection of the rear edge of the leading perforation 42. Accordingly, the recording of the magnetic data can be accurately started within the preset frame magnetic recording portion 45.

Further, the feeding speed of the film 22 is calculated by counting the pulse number of the rotation sensor 33 during the passage of the perforation 42, and the recording frequency of the magnetic data is determined based on the calculated feeding speed. Accordingly, the magnetic data can be accurately recorded within the preset magnetic recording portion 45 at a proper bit density.

Further, since the film 22 is fed without turning the motor 14 on and off during the recording of the magnetic data, it can be fed at a constant speed by preventing the feeding speed from varying due to a variation of a current to be consumed. This prevents a variation in the bit density (recording length) of the magnetic data. Therefore, the magnetic data can be accurately read.

Further, since the feeding speed of the film 22 is reduced after the recording of the magnetic data is completed, the feed of the film 22 can be stopped within a short period of time after the detection of the rear edge of the perforation 41. Accordingly, the feed of the film 22 can accurately be stopped.

The rotating speed $V_2$ is set such that the feed of the film 22 is stopped within a short period of time after the start of deceleration in Step #70 and the frame 43 of the film 22 can accurately be positioned with respect to the exposure aperture 26 as shown in FIG. 13.

In the second embodiment, since d7=d8, the position of the magnetic head 36 coincides with that of the first PS 17 with respect to the film feeding direction. If d7≠d8, a pulse number corresponding to a distance (d5+d8−d7) taking the distance between the leading perforation sensor 17 and the magnetic head 36 into account may be calculated in Step #200.

Figure 17:
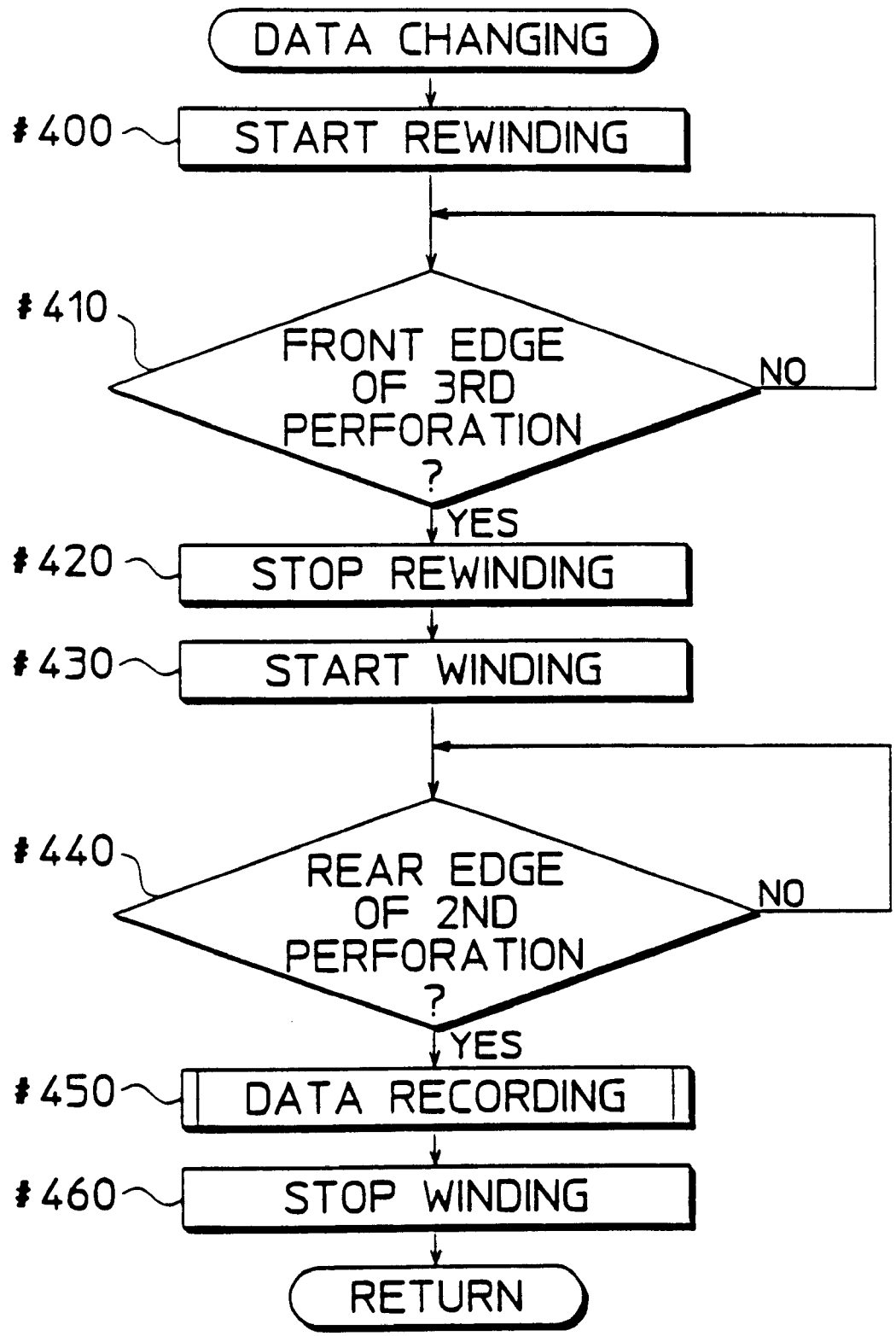
FIG. 17 is a flowchart of a subroutine "Data Changing" executed in Step #130 of FIG. 16.
Figure 18:
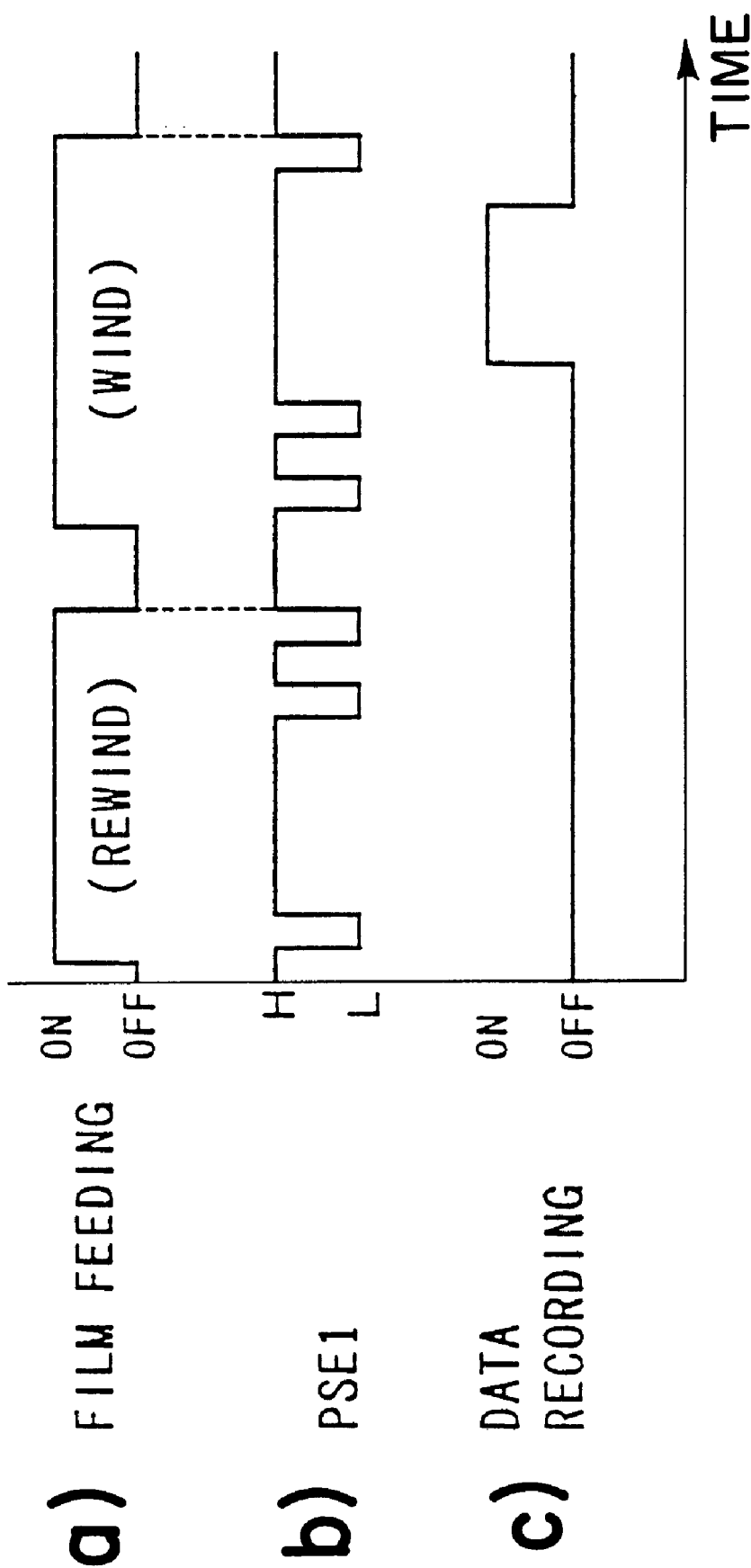
FIG. 18 is a timing chart showing the states of the respective elements in the second embodiment.

FIG. 17 is a flowchart showing the subroutine "Data Changing" executed in Step #130 of FIG. 16, and FIG. 18 is a timing chart showing the states of the respective elements for the explanation of the subroutine "Data Changing".

First, the motor 14 and the cartridge deceleration system 31 are driven to start the rewinding of the film 22 (Step #400). When the front edge of third perforation, i.e. of the perforation 41 one frame before the frame corresponding to the frame magnetic recording portion whose data are to be changed is detected by the first PS 17 (YES in Step #410), the rewinding is stopped as shown in FIG. 18 (Step #420).

Subsequently, the motor 14 and the take-up spool deceleration system 32 are driven to start the winding of the film 22 (Step #430). When the rear edge of the second perforation, i.e. of the perforation 42 corresponding to the frame whose data are to be changed is detected (YES in Step #440), the subroutine "Data Recording" of FIG. 9 is called to change the recorded data (Step #450). This subroutine ends after the winding is stopped (Step #460).

In this way, since the data in the frame magnetic recording portion corresponding to the one previous frame can be changed after the photographing operation, data including an information concerning the number of prints to be made, e.g. according to the number of photographed persons can easily be changed, thereby improving the operability of the camera.

Similar to the data recording after the photographing operation, a change data is recorded in the frame magnetic recording portion 45 during the winding of the film 22. Accordingly, the data can be recorded at a uniform bit density and with high accuracy by ensuring an accurate feed by the take-up spool deceleration system 32.

Although the rewinding is performed until the front edge of the third perforation is detected in Step #410, the rewinding may be stopped after the film 22 is rewound until the second perforation is detected, i.e. the film 22 is rewound by one frame. In such a case, the data can similarly be changed by determining whether the rear edge of the leading perforation has been detected in Step #440.

In Step #450, for a data to which no change has been made, the initially recorded data stored in the RAM 62 are recorded without being changed.

Figure 19:
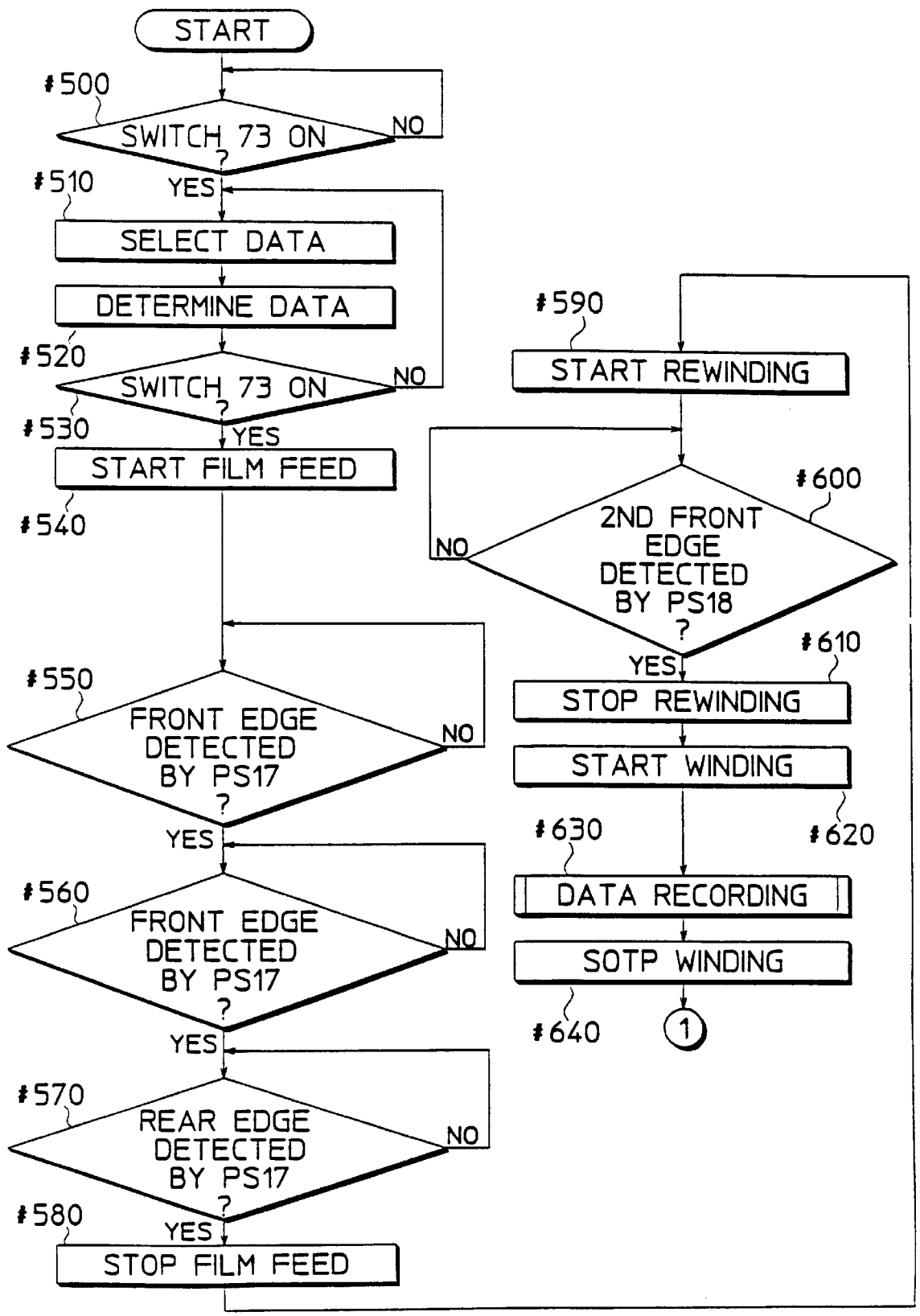

Next, the recording of the data in the leader magnetic recording portion 44 is described with reference to FIGS. 19 to 22. FIGS. 19 and 20 are a flowchart showing a procedure of data recording, FIG. 21 is a timing chart showing the states of the respective elements for the explanation of the above procedure, and FIG. 22 is a diagram showing the detection of the position of the leader magnetic recording portion 44.

Although it is possible to record the magnetic data in the leader magnetic recording portion 44 during the rewinding from the leading frame of the film, the recording is performed during the winding to the leading frame of the film for the reason to be described later.

It is assumed that the film 22 is completely contained in the film cartridge 21 in an initial state before the recording of the magnetic data in the leader magnetic recording portion 44.

First, it is determined whether the leader data setting mode switch 73 is on (Step #500). If the switch 73 is off (NO in Step #500), this routine waits on standby.

On the other hand, when the switch 73 is turned on (YES in Step #500), the cursor in the screen of the display device 55 is scrolled by operating the data content selection scroll switch 75 (Step #510). The data pointed by the cursor is then determined as the selection data by operating the data content determining switch 76 (Step #520).

Subsequently, it is determined again whether the leader data setting mode switch 73 is on (Step #530). If the switch 73 is off (NO in Step #530), Steps #510 and #520 are repeated to enable the selection and determination of different kinds of data.

When the switch 73 is turned on (YES in Step #530), the recording of the magnetic data in the leader magnetic recording portion 44 is started.

Specifically, the feed of the film 22 is started (Step #540), and it is determined whether the leading end of the film 22 has been detected by the first PS 17 (Step #550). Upon detecting the leading end of the film 22 (YES in Step #550, t1 in FIG. 21), it is then determined whether the front edge of the leading perforation 41 has been detected by the second PS 18 (Step #560). Upon detecting the front edge of the leading perforation 41 (YES in Step #560, t2 in FIG. 21), it is determined whether the rear edge of the leading perforation 41 has been detected by the first PS 17 (Step #570).

Upon detecting the rear edge of the leading perforation 41 (YES in Step #570, t3 in FIG. 21), the feed of the film 22 is stopped (Step #580). As a result, the first frame of the film 22 is located in the image recording position as shown in FIG. 13.

Subsequently, the rewinding of the film 22 is started (Step #590), and it is determined whether the front edge of the second perforation from the start of the rewinding, i.e. of the leading perforation 42 has been detected by the second PS 18 (Step #600). Upon detecting the front edge of the leading perforation 42 (YES in Step #600, t4 in FIG. 21), the rewinding is stopped (Step #610).

At this time, the film 22 is positioned as shown in FIG. 22. More specifically, the perforations 41, 42 at the leading end of the film 22 are located at the left and right sides of the second PS 18. On the other hand, virtual perforations 41, 42 assumed to exist before the leading frame are located at the left and right sides of the first PS 17. A virtual 0-th frame 43 is located in the image recording position.

Accordingly, during the winding of the film 22, the detection of the rear edge of the leading perforation 42 by the second PS 18 corresponds to the detection of the rear edge of the virtual perforation 42 by the first PS 17.

On the other hand, as described with reference to FIG. 4, the distance between the rear edge of the leading perforation 42 and that of the virtual perforation 42 is d1, and the distance between the rear edge of the leading perforation 42 and that of the front end of the leader magnetic recording portion 44 is d3.

As is clear from above, if the film 22 is wound by a distance (d1−d3) after the detection of the rear edge of the leading perforation 42 by the second PS 18, the front end of the leader magnetic recording portion 44 faces the magnetic head 36.

Referring back to FIG. 19, the winding is started (Step #620); the subroutine "Data Recording" described with reference to FIG. 9 is executed (Step #630); and the winding is stopped (Step #640, t5 in FIG. 21).

It should be noted that the distance (d1–d3) is used instead of the distance d5 in Step #630. Further, the second PS 18 is used instead of the first PS 17 to detect the perforations. Except the above two points, the subroutine "Data Recording" is executed in the procedure as described with reference to FIG. 9.

Subsequently, the rewinding is started (Step #650), and it is determined whether the rear edge of the perforation has been detected by the first PS 17 (Step #660). Upon detecting the edge of the perforation (YES in Step #660, t6 in FIG. 21), counting by a timer is started (Step #670). It is then determined whether the front edge of the perforation has been detected by the first PS 17 (Step #680).

Unless the front edge is detected (NO in Step #680), it is determined whether a counted time has exceeded a predetermined time T (Step #690). The determination is continued by returning to Step #680 until the predetermined time T elapses (NO in Step #690).

When the front edge of the perforation is detected by the first PS 17 (YES in Step #680), the timer having been measuring time is reset to 0 (Step #700) and this routine returns to Step #660 to repeat the above operations.

If the counted time exceeds the predetermined time T without the front edge of the perforation being detected by the first PS 17 (YES in Step #690), the rewinding is stopped on the assumption that the leading end of the film 22 has already passed (Step #710, t7 of FIG. 21).

The predetermined time T is a sufficiently long time for the film 22 to completely be contained in the film cartridge 21 by the rewinding after the leading end thereof is detected by the first PS 17.

As described above, since the virtual 0-th frame of the film 22 is detected using the second PS 18, the leader magnetic recording portion 44 can accurately be detected in the same procedure as when the data is recorded in the frame magnetic recording portion 45. Accordingly, the data can securely be recorded within the leader magnetic recording portion 44.

Further, since the recording of the magnetic data in the leader magnetic recording portion 44 is performed during the winding as the recording of the magnetic data in the frame magnetic recording portion 45, the feed accuracy by the take-up spool deceleration system 32 can be ensured. As a result, the magnetic data can accurately be recorded within the leader magnetic recording portion 44 at uniform bit density.

As described above, according to the second embodiment, the data concerning the frame in which the photographed image is recorded is recorded in the magnetic recording portion corresponding to this frame while the film is wound by one frame after the photographing. When the data is changed, the film is wound after being rewound to the magnetic recording portion whose data is to be changed. During this film winding, the change data is recorded in the magnetic recording portion. Accordingly, the change data can be recorded in the same state as the initial data recording performed for each photographing operation. Therefore, all the magnetic data can be recorded in the substantially same state, which improves an accuracy in reading the recorded magnetic data.

Further, the film contained in the film cartridge is wound at least to the first frame; rewound to the leader magnetic recording portion; and then wound again. The data concerning the film is recorded during the rewinding. Accordingly, the data can be recorded in the leader magnetic recording portion in the same state as the data recording in the frame magnetic recording portion performed for each photographing operation. Therefore, all the magnetic data can be recorded in substantially the same state, which improves an accuracy in reading the recorded magnetic data.

Furthermore, the first and second perforation sensors are provided in positions where they can face the respective perforations which move during the film winding and at the opposite ends of the exposure window with respect to the film winding direction. Since the spacing between the first and second perforation sensors coincides with the spacing between a pair of perforations for the position reference, the detection timing of the perforation by the leading perforation sensor can coincide with the detection timing of the perforation by the second perforation sensor during the film winding. Accordingly, the feed control of the film can be performed suitably using either one of the perforation sensors depending on the situation.

The present invention is not limited to the foregoing embodiments, but may be embodied as follows.

(1) The pulse number N between the detection of the rear edge of the perforation 42 and the start of the magnetic data recording which is calculated in Step #200 of FIG. 9 may be calculated: N=M×d5/d0 after the pulse number M is obtained in Step #240. The same effects can be obtained by this calculation.

(2) In consideration of a position detection error, a specified value of about 10 pulses may be added to the calculated pulse number N. This makes it possible to more securely record the magnetic data within the frame magnetic recording portion 45.

(3) Although the deceleration in Step #300 of FIG. 9 is started upon the completion of the magnetic data recording in the foregoing embodiments, it may alternatively be started upon detecting the front edge of the perforation 41 which is subjected to the rear edge detection in Step #310.

(4) A duty ratio used for the supply of current to the motor 14 after the rotating speed of the motor 14 is reduced to $V_2$ in Step #300 of FIG. 9 may be determined using at least one of an on-off characteristic, ambient temperature and a supply voltage of the motor 14 as a parameter. By doing so, the rotating speed $V_2$ can be held at a suitable value according to a variation of each parameter.

(5) Although the data in the frame magnetic recording portion 45 corresponding to the frame one frame before the one presently in the image recording position is changed in the second embodiment, the data in the frame magnetic recording portion 45 of any desired frame may be changed. This may be done as follows. The frame whose data is to be changed is designated. Since the frame number of the frame presently in the image recording position is known, the film 22 is rewound to the designated frame while counting the perforations. Thereafter, the change data is recorded while the film 22 is wound. In this case, the data recorded in the frames up to the present frame may be stored in the RAM 62 and the data in the frame magnetic recording portion 45 may be renewed by reading the data not to be changed from the RAM 62.

(6) Although the film 22 is fed to the first frame when the data is recorded in the leader magnetic recording portion 44 in the second embodiment, it may be fed to the second frame or any specified frame position.

(7) The film feeding speed may be calculated by counting a time corresponding to a pulse duration of the sensor signal SMP of the rotation sensor 33 immediately before t1 of FIG. 7. This enables the calculation of the film feeding speed immediately before the recording of the magnetic data. The recording frequency for the magnetic data can properly be determined based on this calculation result.

(8) In the subroutine "Data Changing" of FIG. 17, the data recorded in the frame magnetic recording portion 45 to be subjected to the data change may be erased by applying a specified recording current to the magnetic head 36 while one frame of the film 22 is rewound. If the data is simply written over the previous data, there is a likelihood that the previously recorded data may remain, although in the form of a very weak signal. However, by erasing the data during the rewinding, a signal-to-noise (SIN) ratio in the recording of the change data can be improved.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A camera loadable with a film having perforations along a length of the film and capable of exposing the film in areas corresponding to the perforations, the camera comprising a perforation detecting system that includes two detectors provided at positions such that the detectors are operable to face perforations at forward and rearward ends of an exposed area with respect to a winding direction of the film, the two detectors being positioned with a gap between them that is equal to the spacing between a first perforation of a first frame and a first perforation of a frame adjacent to said first frame.

* * * * *